United States Patent
Soya et al.

(10) Patent No.: US 7,394,484 B2
(45) Date of Patent: Jul. 1, 2008

(54) PHOTOGRAPHIC APPARATUS AND PHOTOGRAPHIC METHOD USING SAME

(75) Inventors: Hideki Soya, Kyoto (JP); Kenji Takubo, Kyoto (JP); Yasushi Kondo, Kyoto (JP); Takeharu Etoh, 7-21-2 Aomatani-Higashi, Minoo-shi, Osaka-fu, 562-0022 (JP)

(73) Assignees: Shimadzu Corporation, Kyoto (JP); Takeharu Etoh, Osaka (JP)

( * ) Notice: Subject to any disclaimer, the term of this patent is extended or adjusted under 35 U.S.C. 154(b) by 901 days.

(21) Appl. No.: 10/455,725

(22) Filed: Jun. 6, 2003

(65) Prior Publication Data
US 2003/0227545 A1    Dec. 11, 2003

(30) Foreign Application Priority Data
Jun. 10, 2002  (JP)  ............................. 2002-168342
Jul. 31, 2002  (JP)  ............................. 2002-223549

(51) Int. Cl.
*H04N 5/228* (2006.01)
(52) U.S. Cl. ............................................. 348/208.16
(58) Field of Classification Search ............ 348/207.99, 348/208.16, 542
See application file for complete search history.

(56) References Cited

U.S. PATENT DOCUMENTS

| 5,196,938 | A | * | 3/1993 | Blessinger | ................. | 348/22 |
| 5,331,896 | A | * | 7/1994 | Sullivan, Jr. | ................. | 102/322 |
| 5,828,793 | A | * | 10/1998 | Mann | ......................... | 382/284 |
| 6,002,429 | A | * | 12/1999 | Ochi et al. | ............... | 348/220.1 |
| 6,157,408 | A | * | 12/2000 | Etoh | .......................... | 348/316 |
| 2003/0107648 | A1 | * | 6/2003 | Stewart et al. | ............. | 348/143 |
| 2003/0146981 | A1 | * | 8/2003 | Bean et al. | ............... | 348/222.1 |

FOREIGN PATENT DOCUMENTS

JP    2000-125183    4/2000
JP    2002-152602    5/2002

OTHER PUBLICATIONS

Office Action dated, Apr. 24, 2007.

* cited by examiner

*Primary Examiner*—James M Hannett
(74) *Attorney, Agent, or Firm*—Cheng Law Group PLLC

(57) ABSTRACT

A photographing apparatus includes a photographing plan memory for setting photographing conditions based on a predetermined photographing plan, a vibration sensor for detecting vibration caused by an explosion of a balloon serving as a photographic subject, and a trigger generating circuit for taking in the timing of detection by the vibration sensor as a trigger. The above photographing plan is prepared beforehand for changing from low-speed photography to high-speed photography in response to the trigger, and changing from high-speed photography to low-speed photography after acquiring "40 frames". With this plan, the low-speed photography is adopted before and after the balloon explosion, an amount of photographic data tends to be small. Photographs may be taken out within limited photographic data, even with a limited memory capacity. At a moment of balloon explosion, rapid variations due to the explosion may be photographed by high-speed photography with high accuracy.

17 Claims, 18 Drawing Sheets

Fig.3

| photographing mode | trigger | frame No. | photographing speed (frames per second) |
|---|---|---|---|
| low speed | no | 0 | 10,000 |
| low speed | no | ⋮ | 10,000 |
| low speed | no | x-1 | 10,000 |
| high speed | yes | x | 100,000 |
| high speed | no | ⋮ | 100,000 |
| high speed | no | x+39 | 100,000 |
| low speed | no | x+40 | 20,000 |
| low speed | no | ⋮ | 20,000 |
| low speed | no | x+69 | 20,000 | explosion ⟶ (high speed row)

Fig.8

| photographing mode | frame No. | photographing speed (frames per second) |
|---|---|---|
| low speed | 0 | 10,000 |
| low speed | : | 10,000 |
| low speed | 29 | 10,000 |
| high speed | 30 | 100,000 |
| high speed | : | 100,000 |
| high speed | 69 | 100,000 |
| low speed | 70 | 20,000 |
| low speed | : | 20,000 |
| low speed | 99 | 20,000 | destruction → (at high speed, frame 30)

Fig.10

| photographing mode | trigger | frame No. | photographing speed (frames per second) |
|---|---|---|---|
| low speed | no | 0 | 10,000 |
| low speed | no | ⋮ | 10,000 |
| low speed | no | 39 | 10,000 |
| low speed | no | 40 | 10,000 |
| low speed | no | ⋮ | 10,000 |
| low speed | no | 40+(y−1) | 10,000 |
| high speed | yes | y+40 | 100,000 |
| high speed | no | ⋮ | 100,000 |
| high speed | no | y+69 | 100,000 |
| low speed | no | y+70 | 20,000 |
| low speed | no | ⋮ | 20,000 |
| low speed | no | y+99 | 20,000 | stimulus → (at row "low speed, no, 40, 10,000")

movement → (at row "high speed, yes, y+40, 100,000")

PHOTOGRAPHIC APPARATUS AND PHOTOGRAPHIC METHOD USING SAME

BACKGROUND OF THE INVENTION (1) Field of the Invention

This invention relates to a photographic apparatus such as a video camera, and a photographic method using this apparatus. More particularly, the invention relates to a photographic technique for use in scientific measurement concerning fast moving bodies such as rockets, explosion, turbulence, electric discharge, movement of microbes under a microscope, and signal transfer of the brain and nervous system.

(2) Description of the Related Art

A conventional high-speed photographic apparatus (high-speed video camera) has fixed photographing intervals, i.e. a fixed photographing speed, when performing a series of photographic operations. At a moment a phenomenon occurs with a photographic subject, the occurrence varies rapidly. It is therefore desirable to photograph the photographic subject at short intervals, i.e. at high speed, in order to secure detailed results. On the other hand, before or after the occurrence of a phenomenon, variations are slow. It is desirable to photograph the photographic subject at relatively long intervals, i.e. at low speed. The term "photographing interval" used in this specification represents time per unit frame (the unit being seconds per frame). The "photographing speed" represents the number of frames per unit time (the unit being frames per second). That is, the photographing speed is the inverse of the photographing interval.

(I) However, with a high-speed camera having a fixed photographing speed, short photographing intervals resulting in an increased amount of photographic data, or a limited memory capacity, makes a whole series of photographic operations impossible. Conversely, long photographing intervals will result in a failure to photograph rapid variations.

(II) When obtaining image information for checking variations occurring with a photographic subject in greater details, that is when obtaining image information for a plurality of frames in a unit photographing time, as shown in the timing chart of FIG. 1, a light source is driven a plurality of times (three times in FIG. 1) to illuminate the photographic subject within one exposure time $t_1$. In this case, it is necessary to use a special laser light as the light source in order to illuminate the subject at minute intervals with high accuracy.

Since the unit photographing time and exposure time are fixed for a series of photographic operations, that is since one exposure is carried out within the exposure time, image information cannot be obtained to reflect variations occurring with the photographic subject with high accuracy. When photographing an explosion accompanied by self-flashing, for example, rapid variations accompanied by flashing take place at a moment of occurrence of the phenomenon. Therefore, an exposure time for avoiding halation due to an excessive quantity of light entering the device is taken into account, and a short unit exposure time is set. However, after the occurrence of the phenomenon, photography is continued with the same conditions despite a reduction in the quantity of light by flashing and a slackening in the variations of the phenomenon. Consequently, dynamic images all clear from beginning to end cannot be obtained based on a series of image information obtained.

When obtaining image information for a plurality of frames in a unit photographing time, a multiple exposure is carried out by driving the light source a plurality of times during one exposure within the unit photographing time. Thus, all the image information obtained from one exposure is displayed in superimposition on one image. As a result, it is difficult to distinguish and check image information on the dynamic image.

Since the conventional apparatus has the unit photographing time and exposure time remaining fixed for a series of photographic operations, it is a complicated operation to set optimal conditions for photographing a photographic subject, with an additional drawback of increased cost. That is, in order to obtain clear image information, duplication experiment must be carried out by varying the exposure time a plurality of times before production photography.

SUMMARY OF THE INVENTION

This invention has been made having regard to the state of the art noted above, and its object is to provide a photographic apparatus and a photographic method using this apparatus (I) for performing photography with high accuracy with limited photographic data, and (II) for performing photography with high accuracy according to states of a photographic subject.

Inventors have carried out intensive research to solve the above problem (I), and attained the following finding.

With the conventional photographic apparatus having a relatively slow photographing speed, the amount of photographic data tends to remain small, and a whole series of photographic operations may be carried out even with a limited memory capacity. A photographic apparatus today has a high photographing speed of $1.0 \times 10^6$ frames per second (1,000,000 frames per second). As noted above, an increased amount of photographic data or a limited memory capacity makes a whole series of photographic operations impossible. To solve this drawback, it is conceivable to take photographs only at a moment of occurrence of a phenomenon, or increase memory capacity.

However, in the case of a spontaneous phenomenon such as an explosion, for example, it is impossible to know when the explosion will take place. It is therefore difficult to take photographs only at the moment of occurrence of the phenomenon. An increase in memory capacity gives rise to a different problem of enlarging the photographic apparatus.

On the other hand, with a photographic apparatus having a relatively slow photographing speed, as noted above, the amount of photographic data tends to remain small, and a whole series of photographic operations may be carried out even with a limited memory capacity. Thus, no consideration is made as to varying photographic conditions during a series of photographic operations. Variations of the photographic conditions would encumber photographing controls. Inventors have adopted a different approach and undertaken to vary photographic conditions during a series of photographic operations. It has been found that photography may be carried out with high accuracy with limited photographic data. A photographic apparatus according to this invention, based on the above finding, has the following construction.

The photographic apparatus has an image pickup device for taking in optical images of a photographic subject, performing a photoelectric conversion of the optical images taken in, and outputting the images as electric signals, the electric signals outputted from the image pickup device being processed as photographic images, the apparatus comprising a photographing condition varying device for varying, during a series of photographing operations, photographing conditions which are a physical quantity of the apparatus needed for performing the photography.

With this photographic apparatus, photography may be carried out with high accuracy and with limited photographic data by providing the photographing condition varying device for varying, during a series of photographing operations, photographing conditions which are a physical quantity of the apparatus needed for performing the photography. That is, photographs are taken at short intervals, i.e. in high-speed photography, at the moment of occurrence of a phenomenon. Thus, photography is carried out with high accuracy to pick up images of rapid variations. Photographs are taken at long intervals, i.e. in low-speed photography before and after the phenomenon. The amount of photographic data tends to be small before and after the balloon explosion. Thus, photography may be carried out even with a limited memory capacity, i.e. with limited photographic data.

The invention noted above includes a manual switching of the photographing conditions made at an appropriate time. Where, for example, the phenomenon is spontaneous, such as an explosion, the time of occurrence of the explosion is unknown and it is difficult to determine when a switching should be made. Thus, where the phenomenon is an explosion, a photographing plan may be prepared in advance by taking an expected time of the explosion into account. Based on this finding, the photographic apparatus may have the following construction.

In the photographic apparatus according to this invention, the photographing condition varying device is a photography planning device for setting the photographing conditions based on a predetermined photographing plan, the photography planning device being arranged to vary the photographing conditions during the series of photographing operations based on the photographing plan.

Since the photographing condition varying device is a photography planning device for setting the photographing conditions based on a predetermined photographing plan, and varying the photographing conditions during the series of photographing operations based on the photographing plan, photography may be carried out easily while varying the photographing conditions during the series of photographing operations, by preparing the predetermined photographing plan in advance. Thus, where the phenomenon is an explosion, a photographing plan may be prepared in advance by taking an expected time of the explosion into account. The timing of varying the photographing conditions may be determined with ease, to facilitate the series of operations for photographing the explosion including states before and after the explosion.

The above construction according to this invention facilitates photography even where the phenomenon is spontaneous, such as an explosion. However, a lag could occur between an expected time of the explosion and a time when the explosion actually occurs. To further facilitate photography, the following construction is preferred.

The photographic apparatus further comprises a trigger input device for detecting a motion of the photographic subject and taking in a time of detection as a trigger, the photographing condition varying device or photography planning device being arranged to vary the photographing conditions during the series of photographing operations based on the trigger from the trigger input device.

With this photographic apparatus, the trigger input device detects a motion of the photographic subject and takes in a time of detection as a trigger, and the photographing condition varying device or photography planning device varies the photographing conditions during the series of photographing operations based on the trigger from the trigger input device. Based on an actual motion of the photographic subject, the timing of varying the photographing conditions may be determined with increased ease, to facilitate photography. Where the phenomenon (motion of the photographic subject) is an explosion, the trigger input device takes in vibration caused by the explosion as a trigger. Based on the trigger, the timing of varying the photographing conditions may be determined with increased ease, to facilitate photography of the explosion including states before and after the explosion.

The above construction is effective for photographing a spontaneous phenomenon such as an explosion, i.e. where the time of occurrence of a motion of the photographic subject is unknown. However, the following construction is effective where the phenomenon (motion of the photographic subject) is movement of microbes caused by application of a stimulus, i.e. where the phenomenon is caused (or a stimulus is applied to the microbes).

This photographic apparatus further comprises a motion applying device for applying a predetermined motion to the photographic subject, and a trigger output device for outputting a trigger in timed relationship with the predetermined motion applied from the motion applying device to the photographic subject, the photographing condition varying device or photography planning device being arranged to vary the photographing conditions during the series of photographing operations based on the trigger from the trigger output device.

With this photographic apparatus, the motion applying device applies a predetermined motion to the photographic subject, and the trigger output device outputs a trigger in timed relationship with the predetermined motion applied from the motion applying device to the photographic subject. The photographing condition varying device or photography planning device varies the photographing conditions during the series of photographing operations based on the trigger from the trigger output device. Thus, photography may be performed with ease in timed relationship with the predetermined motion applied to the photographic subject. Where a stimulus is applied to microbes, e.g. the phenomenon (motion of the photographic subject) is movement of microbes caused by application of a stimulus, the trigger output device outputs a trigger in timed relationship with the application of a stimulus to the microbes. Based on the trigger, a series of photographing operations may be carried out with increased ease, concerning the movement of the microbes including states before and after the application of a stimulus to the microbes.

As in the above two constructions, the photographing conditions may be varied based on the trigger during the series of photographing operations. The photographing conditions may be varied synchronously with a signal from a clock device for controlling operation of the image pickup device.

In one example of synchronization with the signal from the clock device, the apparatus comprises a clock device for controlling operation of the image pickup device, the photographing conditions including photographing intervals between photo-taking acts, the photographing condition varying device or photography planning device being arranged to vary the photographing intervals synchronously with a signal from the clock device. In this case, the photographing conditions are photographing intervals between photo-taking acts. The photographing intervals are varied synchronously with the signal from the clock device for controlling the operation of the image pickup device. Photography may be controlled with increased ease, even though the photographing intervals are varied, by varying the intervals synchronously with the signal from the clock device.

In another example of synchronization with the signal from the clock device, the apparatus comprises a clock device for controlling operation of the image pickup device, the photographing conditions including an exposure time with incident light between photographing intervals between photo-taking acts, the photographing condition varying device or photography planning device being arranged to vary the exposure time synchronously with a signal from the clock device. In this case, the photographing condition is an exposure time with incident light between photographing intervals between photo-taking acts. The exposure time is varied synchronously with the signal from the clock device for controlling the operation of the image pickup device. Photography may be controlled with increased ease, even though the exposure time is varied, by varying the exposure time synchronously with the signal from the clock device.

In a further example of synchronization with the signal from the clock device, the apparatus comprises a clock device for controlling operation of the image pickup device, and an illuminating device for illuminating the photographic subject, the photographing conditions including one of an illumination time for continuously or intermittently emitting light from the illuminating device to the photographic subject and an illumination intensity of the light emitted from the illuminating device to the photographic subject, the photographing condition varying device or photography planning device being arranged to vary one of the illumination time and illumination intensity synchronously with a signal from the clock device. In this case, an illuminating device is provided for illuminating the photographic subject, and the photographing condition is an illumination time for continuously or intermittently emitting light from the illuminating device to the photographic subject or an illumination intensity of the light emitted from the illuminating device to the photographic subject. The illumination time or illumination intensity is varied synchronously with the signal from the clock device for controlling the operation of the image pickup device. Photography may be controlled with increased ease, even though the illumination time or illumination intensity is varied, by varying the illumination time or illumination intensity synchronously with the signal from the clock device.

Usually, the exposure time is set by ratio of photographing intervals. With the photographing intervals varied in this setting, the exposure time becomes short when the photographing intervals are short (fast photographing speed), and the exposure time becomes long when the photographing intervals are long (slow photographing speed). Thus, variations of the photographing intervals result in different quantities of incident light from the illuminating device per unit frame. Photographs may not be taken with an appropriate quantity of incident light.

In one example of taking photographs with an appropriate quantity of incident light, the photographing conditions include photographing intervals between photo-taking acts, and an exposure time with incident light between the photographing intervals, the photographing condition varying device or photography planning device being arranged to maintain the exposure time constant regardless of variations in the photographing intervals.

In another example of taking photographs with an appropriate quantity of incident light, the apparatus further comprises an illuminating device for illuminating the photographic subject, the photographing conditions including photographing intervals between photo-taking acts and one of an illumination time for continuously or intermittently emitting light from the illuminating device to the photographic subject and an illumination intensity of the light emitted from the illuminating device to the photographic subject, the photographing condition varying device or photography planning device being arranged to maintain the exposure time constant regardless of variations in the photographing intervals.

This specification discloses also photographic methods according to the invention.

(1) A photographic method for taking in optical images of a photographic subject, performing a photoelectric conversion of the optical images taken in, outputting the images as electric signals, and processing the electric signals as photographic images, wherein photographing conditions which are a physical quantity of an apparatus needed for performing photography are varied during a series of photographing operations.

According to the above method (1), photography may be carried out with limited photographic data since the photographing conditions are varied during a series of photographing operations.

(2) A photographic method as set forth in (1) above, wherein the photographing conditions are set based on a predetermined photographing plan prepared beforehand, the photographing conditions being varied during the series of photographing operations.

According to the above method (2), photography may be carried out easily while varying the photographing conditions during the series of photographing operations, by preparing the predetermined photographing plan in advance.

(3) A photographic method as set forth in (2) above, wherein the photographing conditions are photographing intervals between photo-taking acts, said predetermined photographing plan being prepared to take photographs at short intervals at a moment of occurrence of a phenomenon with said photographic subject, and at longer intervals at other times than the intervals at the moment of occurrence of the phenomenon with said photographic subject, the photographing intervals being set based on the photographing plan, the photographing intervals set being varied during the series of photographing operations.

According to the above method (3), photographs are taken at short intervals at a moment of occurrence of a phenomenon with the photographic subject, and at longer intervals at other times than the intervals at the moment of occurrence of the phenomenon with the photographic subject. Photography is carried out with high accuracy to pick up images of rapid variations by taking photographs at short intervals at a moment of occurrence of a phenomenon with the photographic subject. By taking photographs at long intervals at other times, the amount of photographic data tends to be small. Thus, photography may be carried out even with a limited memory capacity, i.e. with limited photographic data.

(4) A photographic method as set forth in (2) above, wherein the photographing conditions are photographing intervals between photo-taking acts, and an exposure time with incident light between the photographing intervals, said predetermined photographing plan being prepared to fix the exposure time regardless of variations in the photography intervals, the photographing intervals and the exposure time being set based on the photographing plan.

According to the above method (4), the photographing conditions are photographing intervals between photo-taking acts, and an exposure time with incident light between the photographing intervals. The exposure time is fixed regardless of variations in the photography intervals, thereby taking photographs properly with a fixed quantity of incident light.

(5) A photographic method as set forth in (4) above, wherein the exposure time is set based on a minimum photographing interval among the photographing intervals, the exposure time being less than said minimum photographing interval.

Unless the fixed exposure time is set based on a minimum photographing interval among the photographing intervals, the exposure time could be longer than the photographing intervals. Thus, according to the above method (5), the exposure time is set based on a minimum photographing interval among the photographing intervals, the exposure time being less than said minimum photographing interval, to avoid the above-noted situation.

This invention provides the following photographic apparatus and photographic method to solve the problem (II) noted hereinbefore.

The photographic apparatus has an image sensor with a photo detector for performing a photoelectric conversion of incident light, and a plurality of charge storage elements for storing charge signals received from the photo detector, as classified into a plurality of frames of different photographing times, the image sensor outputting the charge signals stored in the charge storage elements, the apparatus comprising (a) a varying device for varying at least one of a frame interval, a photographing time and an exposure condition a plurality of times for each unit photographing time during a series of photographing operations.

With the photographing apparatus according to this invention, the varying device varies at least one of a frame interval, a photographing time and an exposure condition a plurality of times for each unit photographing time during a series of photographing operations. Photography may be carried out with high accuracy to cope with a photographic subject variable with time, thereby obtaining clear dynamic images.

In the case of an explosion accompanied by self-flashing, for example, the unit photographing time and exposure time are set short for a moment of occurrence of a phenomenon accompanied by a large quantity of light and rapid variations. The unit photographing time and exposure time are set long as the quantity of light reduces and variations of the phenomenon become slack.

Thus, image information may be acquired with an optimal quantity of light for every frame of the unit photographing time. A series of clear dynamic images can be obtained. Efficient photographing may also be performed since more image information than is necessary is acquired when the phenomenon is slack.

Since the varying device can set an optimal quantity of light for every frame of the unit photographing time, it is not necessary to use a special light source as used in the conventional apparatus. That is, when using a light source, an ordinary electric light may be used.

Preferably, the photographing apparatus further comprises (b) an image processing device for performing a plurality of exposures in each unit photographing time during the series of photographing operations, wherein the exposure condition is the number of exposures performed in each unit photographing time, and combining, into one image, image information for a plurality of photographs acquired in each unit photographing time, and (c) a display device for displaying the image information processed.

With the image processing device (b) and display device (c), variation information on the photographic subject moving and varying with time may be outputted on one image. By successively outputting the images for different frames as dynamic images or video images, the variation information on movement and variations of the photographic subject, e.g. a moving direction of an object, may be checked on the dynamic images with increased accuracy.

The photographic method according to this invention made to solve the problem (II) uses the photographic apparatus according to this invention. This method comprises a step of performing a plurality of exposures in each unit photographing time and varying the frame interval during the series of photographing operations.

In the photographic method according to this invention, a plurality of exposures are performed in each unit photographing time, with the frame interval varied during the series of photographing operations. Compared with performing a plurality of exposures with the frame interval fixed, a photographic subject with a large amount of change and a photographic subject with a small amount of change may be checked accurately on the images.

When, for example, image information obtained by setting short all frame intervals that are the intervals between successive exposures within the unit photographing time is compared, a photographic subject with a small amount of change appears in substantially the same position as viewed in the order of photographs. It is difficult to determine movement or variations of this photographic subject. Therefore, in order to determine movement or variations of the photographic subject with a small amount of change, a comparison has to be made between a first image and an image picked up a certain time from the first image. As opposed to this, the successive frame intervals in the unit photographing time may be set as a combination of short intervals and long intervals. Then, a comparison between image information for two successive photographs acquired at a short interval allows an accurate confirmation of movement or variations of the photographic subject with a large amount of change. A comparison between image information for two successive photographs acquired at a long interval allows an accurate confirmation of movement or variations of the photographic subject with a small amount of change.

The photographic method according to this invention, preferably, comprises a step of varying at least one of the unit photographing time and an exposure time, which is the exposure condition, at a fixed rate during the series of photographing operations. With the unit photographing time or exposure time varied at a fixed rate during the series of photographing operations, a photographic subject varying regularly with time may be photographed with high accuracy.

Another preferred embodiment of the photographic method according to this invention comprises a step of performing one exposure in a fixed unit photographing time and varying an exposure time for each exposure during the series of photographing operations. With one exposure performed in the unit photographing time and the exposure time varied for every exposure during the series of photographing operations, duplication experiment may be conducted only once for setting an optimal exposure time for the photographic subject.

When photographing an explosion accompanied by self-flashing, for example, image information for a plurality of photographs may be acquired with the exposure time varied for each unit photographing time. This provides image information with substantially the same condition as when duplication experiment is conducted a plurality of times while varying the exposure time little by little. Thus, duplication experiment may be conducted only once for setting photographing conditions.

In one example of varying the frame interval or exposure time, the variation is made synchronously with a signal received from outside. By varying the frame interval or exposure time synchronously with a signal received from outside, a phenomenon difficult to photograph in a timely way may be photographed easily.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIG. 3 is a view showing a photographing plan prepared and stored in a photographing plan memory in advance;

FIG. 8 is a view showing a photographing plan prepared and stored in a photographing plan memory in advance in the third embodiment;

FIG. 10 is a view showing a photographing plan prepared and stored in a photographing plan memory in advance in the fourth embodiment;

DESCRIPTION OF THE PREFERRED EMBODIMENTS

Preferred embodiments of this invention will be described in detail hereinafter with reference to the drawings.

The following first to fourth embodiments solve the problem (I).

First Embodiment

Figure 1:
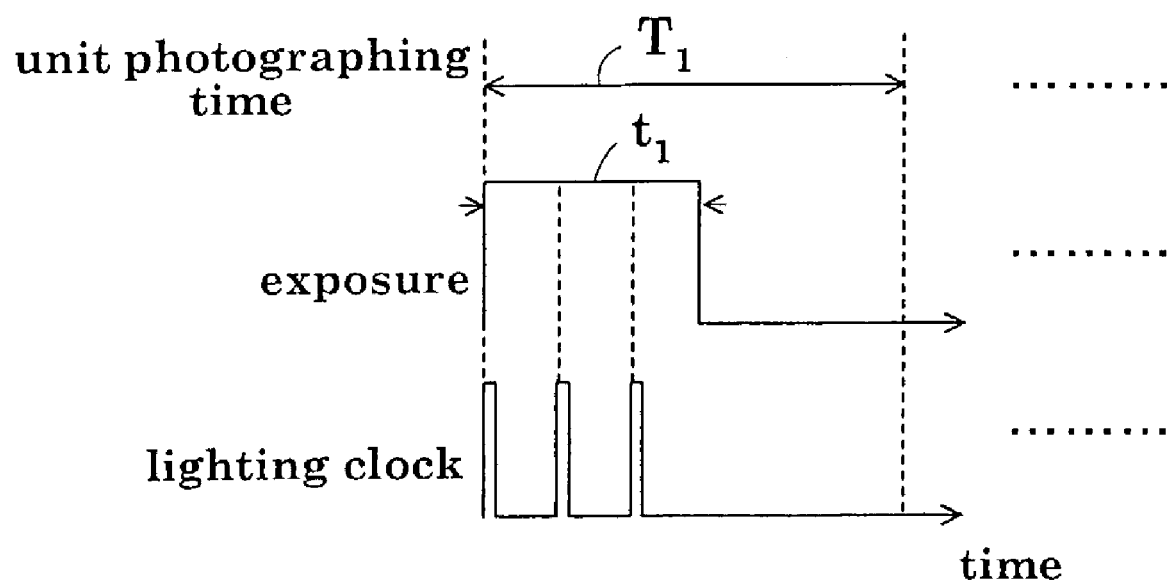
FIG. 1 is a pulse waveform chart showing photographic conditions for multiple exposures within a unit time using a conventional apparatus.
Figure 2:
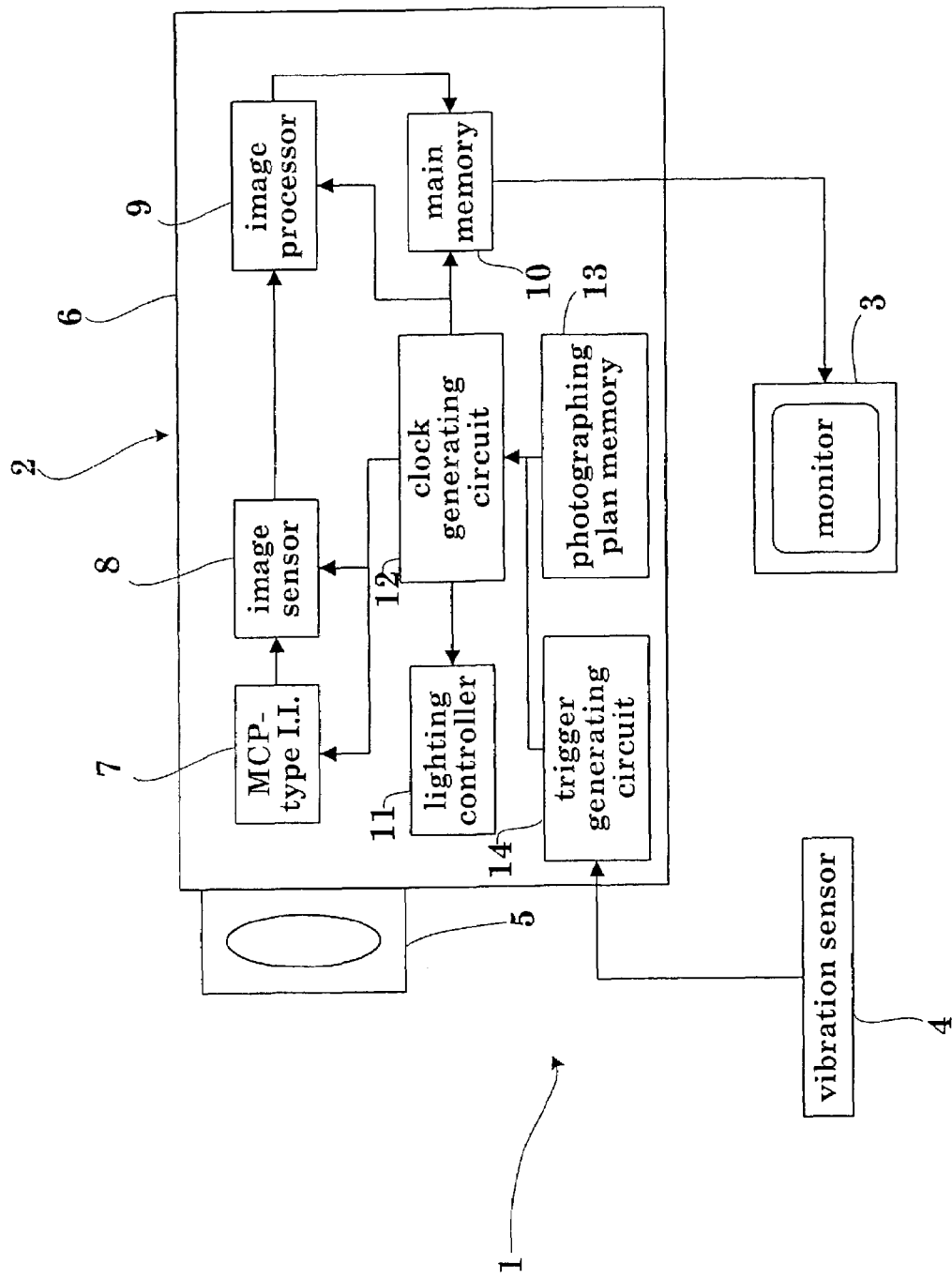
FIG. 2 is a block diagram showing an entire photographic apparatus in a first embodiment of the invention.
Figure 4:
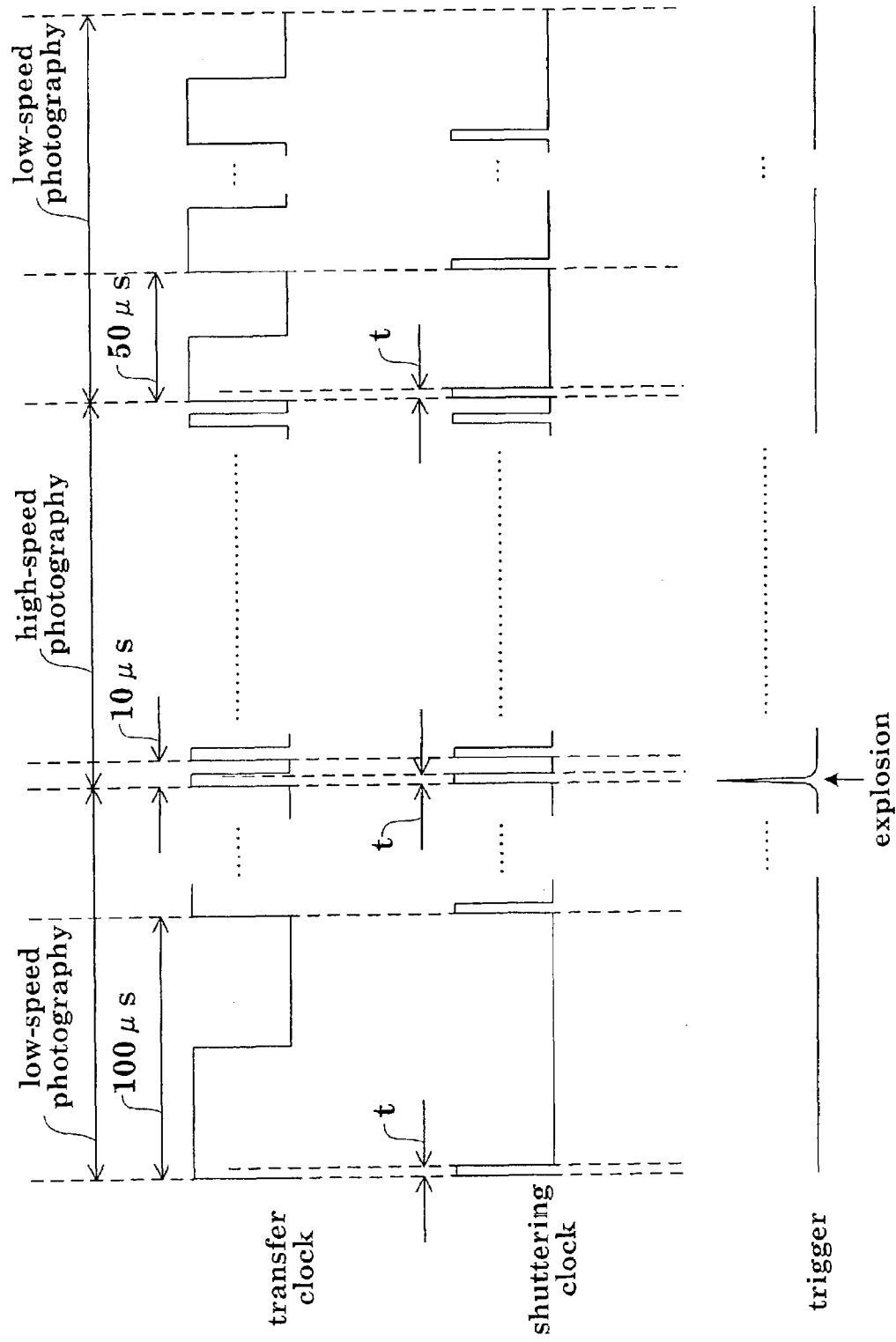
FIG. 4 is a pulse waveform chart showing timing of photographing intervals and exposure time.
Figure 5:
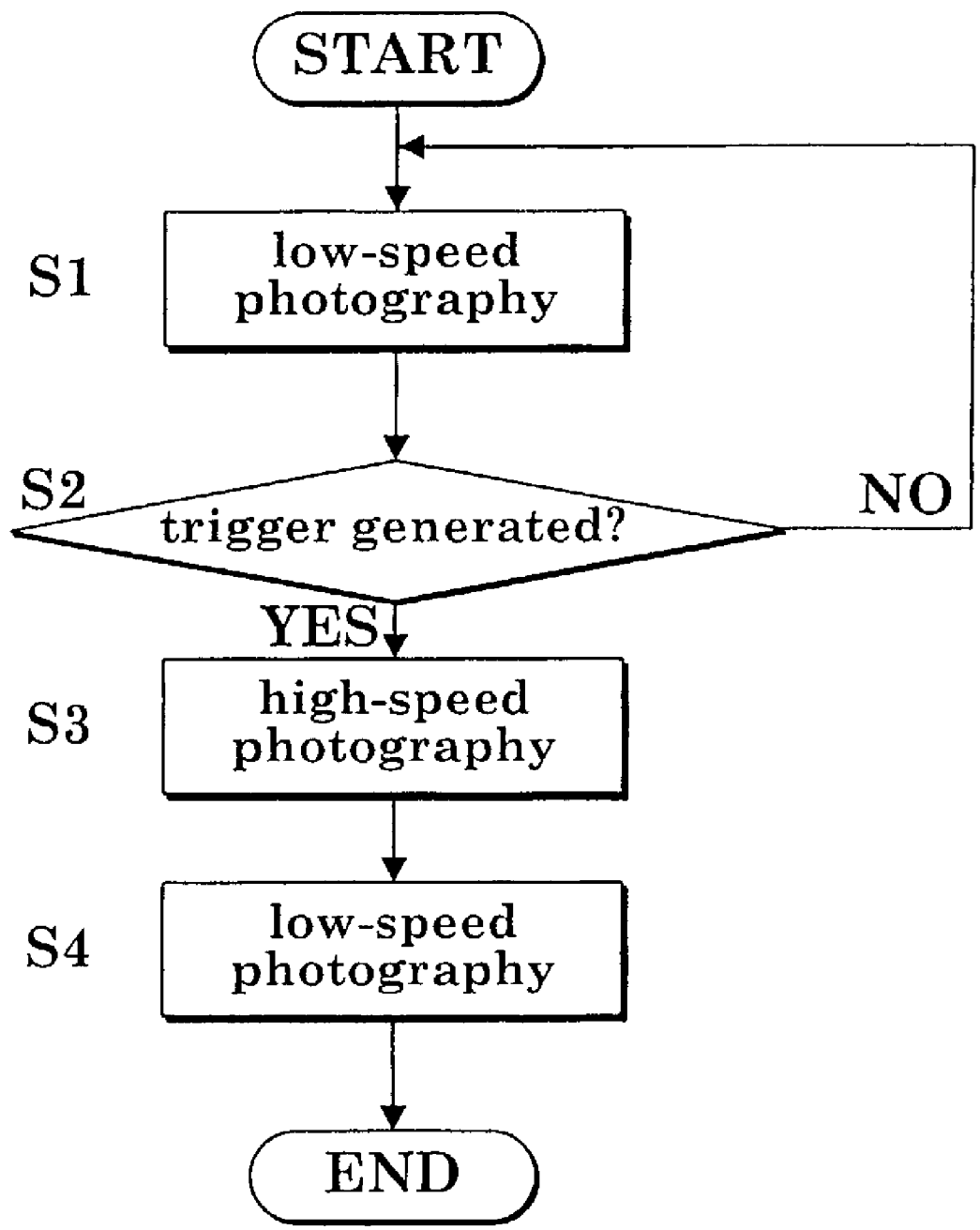
FIG. 5 is a flow chart showing a photographic method in the first embodiment.

FIG. 2 is a block diagram showing an entire photographic apparatus in the first embodiment. FIG. 3 is a view showing a photographing plan prepared and stored in a photographing plan memory in advance in the first embodiment. FIG. 4 is a pulse waveform chart (timing chart) showing timing of photographing intervals and exposure time. FIG. 5 is a flow chart showing a photographic method in the first embodiment. The first embodiment will be described, exemplifying an explosion of a balloon serving as a photographic subject.

Numeral 1 in FIG. 2 denotes the photographic apparatus in the first embodiment. The photographic apparatus 1 includes a main body 2, a monitor 3 and a vibration sensor 4. Though not shown in FIG. 2, the photographic apparatus 1 includes also an operating unit.

The main body 2 includes an optical lens 5 for taking in light from the photographic subject, and a processing block 6 for converting optical images taken in through the optical lens 5 to electric signals and performing various processes.

The processing block 6 includes a microchannel plate type image intensifier (which may be referred to hereinafter as "MCP-type image intensifier") 7, an image sensor 8, an image processor 9, a main memory 10, a lighting controller 11, a clock generating circuit 12, a photographing plan memory 13 and a trigger generating circuit 14.

The MCP-type image intensifier 7 has functions to convert the optical images of the photographic subject or object under examination to photoelectrons, double the photoelectrons by applying a pulse voltage synchronized with a clock signal outputted from the clock generating circuit 12, and then convert the doubled photoelectrons back to optical images. That is, the MCP-type image intensifier 7 acts as a shutter for adjusting on/off switching by applying the pulse voltage synchronized with the clock signal outputted from the clock generating circuit 12. The MCP-type image intensifier 7 is not absolutely necessary, but may be omitted as in a fifth embodiment described hereinafter.

The image sensor 8 has a plurality of photodiodes for photoelectric conversion, and CCD elements, to carry out a photoelectric conversion of the optical images taken in and output them as electric signals. The image sensor 8 has a function to act as a shutter when accumulating charges resulting from the photoelectric conversion and reading the charges. The image sensor 8 corresponds to the image pickup device of this invention.

The image processor 9 has an amplifier and an analog-to-digital converter (not shown) for amplifying the signals and converting these analog signals to digital signals. That is, the image processor 9 has a function to process the electric signals outputted from the image sensor 8 as photographic images. The photographing images processed by the image processor 9 are storied in the main memory 10 and successively displayed on the monitor 3.

The lighting controller 11 has a light emitter and an emitter driver (not shown), and causes the driver to drive the light emitter synchronously with the clock signal outputted from the clock generating circuit 12. The light emitter includes a discharge tube (not shown) filled with a rare gas such as xenon gas. The discharge tube of the light emitter irradiates the photographic subject with visible light or ultraviolet light. The lighting controller 11 corresponds to the illuminating device of this invention. The above light emitter and emitter driver may be arranged outside the main body 2 and controlled by the lighting controller 11 inside the main body 2.

The clock generating circuit 12 has a function to control, en bloc, the MCP-type image intensifier, image sensor 8, image processor 9, main memory 10 and lighting controller 11. Various signals are synchronized with the clock signal outputted from the clock generating circuit 12. The clock generating circuit 12 corresponds to the clock device of this invention.

The photographing plan memory 13 stores a predetermined photographing plan prepared in advance, and sets photographic conditions based on the photographing plan. In the first embodiment, such photographing conditions include photographing intervals and exposure time. Based on the set photographing intervals and exposure time, the MCP-type image intensifier 7 and image sensor 8 are controlled through the clock generating circuit 12. Based on an illumination time and illumination intensity also included in the photographing conditions, the lighting controller 11 is controlled through the clock generating circuit 12. A specific construction of the photographing plan memory 13 will be described hereinafter. The photographing plan memory 13 corresponds to the photography planning device of this invention, and also to the photographing condition varying device of this invention.

The vibration sensor 4 detects vibration produced by an explosion of a balloon. The trigger generating circuit 14 takes in timing of the detection by the vibration sensor 4 as a trigger. The trigger generated by the trigger generating circuit 14 is applied to the clock generating circuit 12. The trigger generating circuit 14 corresponds to the trigger input device of this invention.

The photographing plan memory 13 in the first embodiment stores a photographing plan as shown in FIG. 3, timing as shown in FIG. 4, and a procedure according to the flow chart shown in FIG. 5. Photography is performed according to this flow chart.

The column at the left end in FIG. 3 shows "photographing mode", with "low speed" representing low-speed photography, and "high speed" high-speed photography. The second column from the left shows whether or not a trigger is generated by the trigger generating circuit 14, with "yes" indicating a trigger being generated, and "no" no trigger being generated. The second column from the right in FIG. 3 shows "frame number". Sign "x" is assigned to the frame number coinciding with generation of a trigger, i.e. the explosion of the balloon. The column at the right end in FIG. 3 shows "photographing speed", the unit being frames per second.

In this specification, a photographing speed of 100,000 or more frames per second is regarded as "high-speed photography", and a photographing speed below that as "low-speed photography". The photographing speed for frame Nos. "0" to "x−1" is 10,000 frames per second, and therefore the photographing mode is low-speed photography. The photographing speed for frame Nos. "x" to "x+39" is 100,000 frames per second, and the photographing mode is high-speed photography. The photographing speed for frame Nos. "x+40" to "x+69" is 20,000 frames per second, and the photographing mode is low-speed photography.

The photographing speed is the inverse of the photographing interval. Thus, in time of high-speed photography with the photographing speed at 100,000 frames per second, the photographing interval is $1.0 \times 10^{-5}$ seconds per frame (10 microseconds per frame). In time of low-speed photography with the photographing speed at 10,000 frames per second, the photographing interval is $1.0 \times 10^{-4}$ seconds per frame (100 microseconds per frame). In time of low-speed photography with the photographing speed at 20,000 frames per second, the photographing interval is $5.0 \times 10^{-5}$ seconds per frame (50 microseconds per frame).

A transfer clock in FIG. 4 causes application of the pulse voltage to MCP-type image intensifier 7 to adjust the on/off switching thereof, thereby to control shuttering, i.e. exposure time. A shuttering clock in FIG. 4 is a signal for controlling the lighting controller 11. The light emitter of the lighting controller 11 emits ultraviolet rays synchronously with the shuttering clock.

Output of the shuttering clock is synchronized with each photographing interval of the transfer clock, and the time the shuttering clock is outputted determines the exposure time. The photographing plan memory 13 sets the exposure time to "t" which is fixed regardless of the photographing mode as shown in FIG. 4. The exposure time "t" is set based on a minimum photographing interval among the photographing intervals. In the first embodiment, the minimum photographing interval is 10 microseconds per frame which is the photographing interval for high-speed photography. The exposure time "t" is set shorter than the minimum photographing interval of 10 microseconds per frame. Unless based on the minimum photographing interval of 10 microseconds per frame, a situation could arise where the exposure time "t" is longer than the photographing intervals.

In the first embodiment, when the trigger generating circuit 14 generates a trigger, as shown in FIG. 4, a change is made from the low-speed photography with the photographing speed at 10,000 frames per second (with photographing intervals at 100 microseconds per frame) to the high-speed photography with the photographing speed at 100,000 frames per second (with photographing intervals at 10 microseconds per frame).

In addition, a vertical synchronizing signal, not shown, is a signal for determining timing of an image for one frame, and is also a frame rate for output to the monitor 3. A vertical transfer pulse, not shown, is a signal for successively outputting photographic images in a vertical direction on the monitor 3. An image output, not shown, is a photographic image for one scanning line outputted to the monitor 3. One photographic image for one scanning line is outputted after another in the vertical direction on the monitor 3 at each vertical transfer pulse. An entire image for each frame is outputted to the monitor 3 as a photographic image until a next vertical synchronizing signal is outputted. These signals and clocks are synchronized with the clock signal outputted from the clock generating circuit 12.

Next, the photographic method in the first embodiment will be described with reference to the flow chart of FIG. 5.

(Step S1) Low-Speed Photography

Since variations are slack before the balloon explodes, photographs are taken at relatively long intervals, i.e. at low speed. In the first embodiment, the low-speed photography is performed with the photographing speed at 10,000 frames per second (with the photographing interval at 100 microseconds per frame).

(Step S2) Trigger Generated?

Whether a trigger is generated by the trigger generating circuit 14 is determined. In the absence of a trigger, the low-speed photography in step S1 is continued. When a trigger is generated, the vibration sensor 4 detects the explosion of the balloon as vibration. The timing of detection is taken in as a trigger, and a change is made from the low-speed photography to the high-speed photography in step S3.

(Step S3) High-Speed Photography

At a moment the balloon explodes, rapid variations are caused by the explosion. Thus, photographs are taken at short intervals, i.e. at high speed. In the first embodiment, the high-speed photography is performed with the photographing speed at 100,000 frames per second (with the photographing interval at 10 microseconds per frame) for 40 frames (for frame Nos. "x" to "x+39"). After taking photographs for 40 frames, a change is made from the high-speed photography to the low-speed photography in step S4.

(Step S4) Low-Speed Photography

After lapse of a certain time from the balloon explosion, variations are slack. Thus, photographs are taken at relatively long intervals, i.e. at low speed. In the first embodiment, the low-speed photography is performed with the photographing speed at 20,000 frames per second (with the photographing interval at 50 microseconds per frame).

With the photographic method in steps S1 to S4 and the photographic apparatus 1 in the first embodiment described above, photography may be carried out with high accuracy and with limited photographic data by providing the photographing plan memory 13 that varies photographing conditions during a series of photographing operations. That is, in the first embodiment, photographs are taken at short intervals (high-speed photography) at the moment of balloon explosion (step S3). Thus, photography is carried out with high accuracy to pick up images of rapid variations due to the explosion. Photographs are taken at long intervals (low-speed photography) before and after the balloon explosion (steps S1 and S4). The amount of photographic data tends to be small before and after the balloon explosion. Thus, photography may be carried out even with a limited memory capacity, i.e. with limited photographic data.

The photographing plan memory 13 stores the predetermined photographing plan prepared in advance, sets photographing conditions based on the photographing plan, and changes the photographing conditions during a series of photographing operations, to photograph easily the way in which the balloon explodes. Further, the photographic apparatus 1 includes the vibration sensor 4 for detecting the vibration caused by the explosion of the balloon, and the trigger generating circuit 14 for taking in the timing of detection as a trigger. Based on the trigger, the timing of varying the photographing conditions (i.e. changing from the low-speed photography to the high-speed photography in steps S1-S3) may be determined with increased ease, to facilitate photography of the explosion including states before and after the explosion.

The photographing intervals which are part of the photographing conditions are varied (i.e. changing from the high-speed photography to the low-speed photography in steps S3 and S4) synchronously with the clock signal from the clock generating circuit 12. Even with variations in the photographing intervals, photography may be controlled easily since the variations are synchronized with the clock signal.

Since the exposure time "t" is fixed regardless of the variations in the photography intervals, photography may be carried out properly with a fixed quantity of incident light.

Second Embodiment

Figure 6:
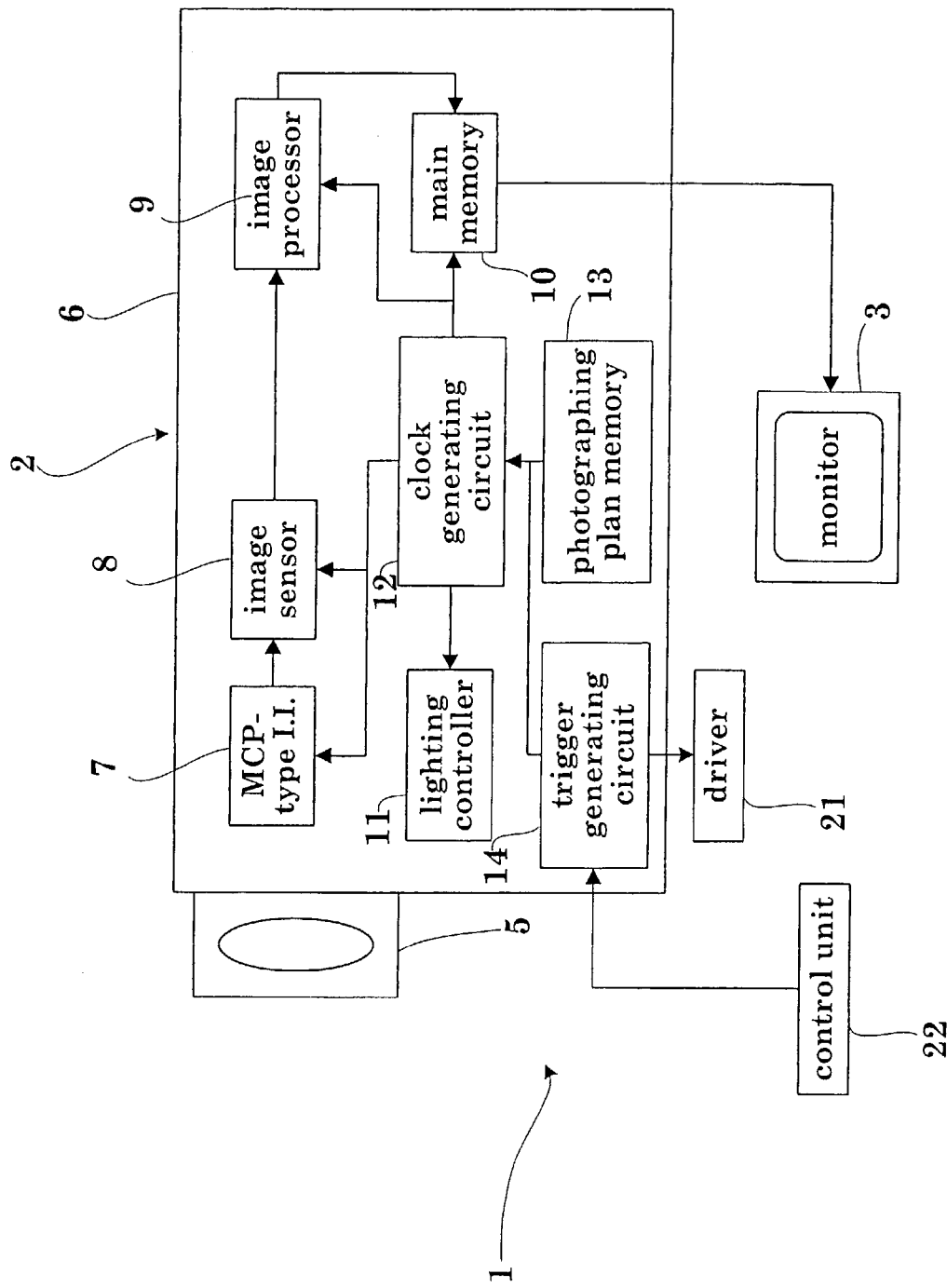
FIG. 6 is a block diagram showing an entire photo-graphic apparatus in a second embodiment.

The second embodiment of this invention will be described next. Like reference numerals are used to identify like parts which are the same as in the first embodiment and will not be described again. A photographic apparatus in the second embodiment has a construction as shown in FIG. 6. This photographic apparatus has the same construction as in the first embodiment shown in FIG. 2, except that the second embodiment includes a driver 21 such as a motor instead of the vibration sensor 4 in the first embodiment, and that the functions of the trigger generating circuit 14 are different between the first and second embodiments. FIG. 6 shows an operating unit 22. The second embodiment will be described, exemplifying photography of an iron ball serving as a photographic subject breaking upon collision with a wall.

The operating unit 22 controls the driver 21 such as a motor through the trigger generating circuit 14, and the driver 21 drives the iron ball toward the wall to collide with the wall. The driver 21 corresponds to the motion applying device of this invention.

When driving the iron ball from the driver 21, the operator inputs an initial position of the iron ball, a position of the wall, a speed of the iron ball and so on to the operating unit 22. These input data are transmitted from the operating unit 22 to the trigger generating circuit 14. The trigger generating circuit 14 computes a time of the iron ball colliding with the wall, and outputs a trigger in timed relationship with the collision while driving the ball through the driver 21. As in the first embodiment, the trigger generated by the trigger generating circuit 14 is applied to the clock generating circuit 12. The trigger generating circuit 14 in the second embodiment corresponds to the trigger output device of this invention.

The photographing plan memory 13 in the second embodiment stores the same photographing plan as in the first embodiment shown in FIG. 3, the same timing as in the first embodiment shown FIG. 4, and the same procedure as in the first embodiment shown in the flow chart of FIG. 5. Photography is performed according to this flow chart.

With the photographing apparatus 1 in the second embodiment, the trigger generating circuit 14 outputs a trigger in timed relationship with the drive applied from the driver 21 to the iron ball. Based on the trigger, the photographing conditions are varied during a series of photographing operations. Thus, the collision including states before and after the collision may be photographed with ease, in timed relationship with the driving of the iron ball.

Third Embodiment

Figure 7:
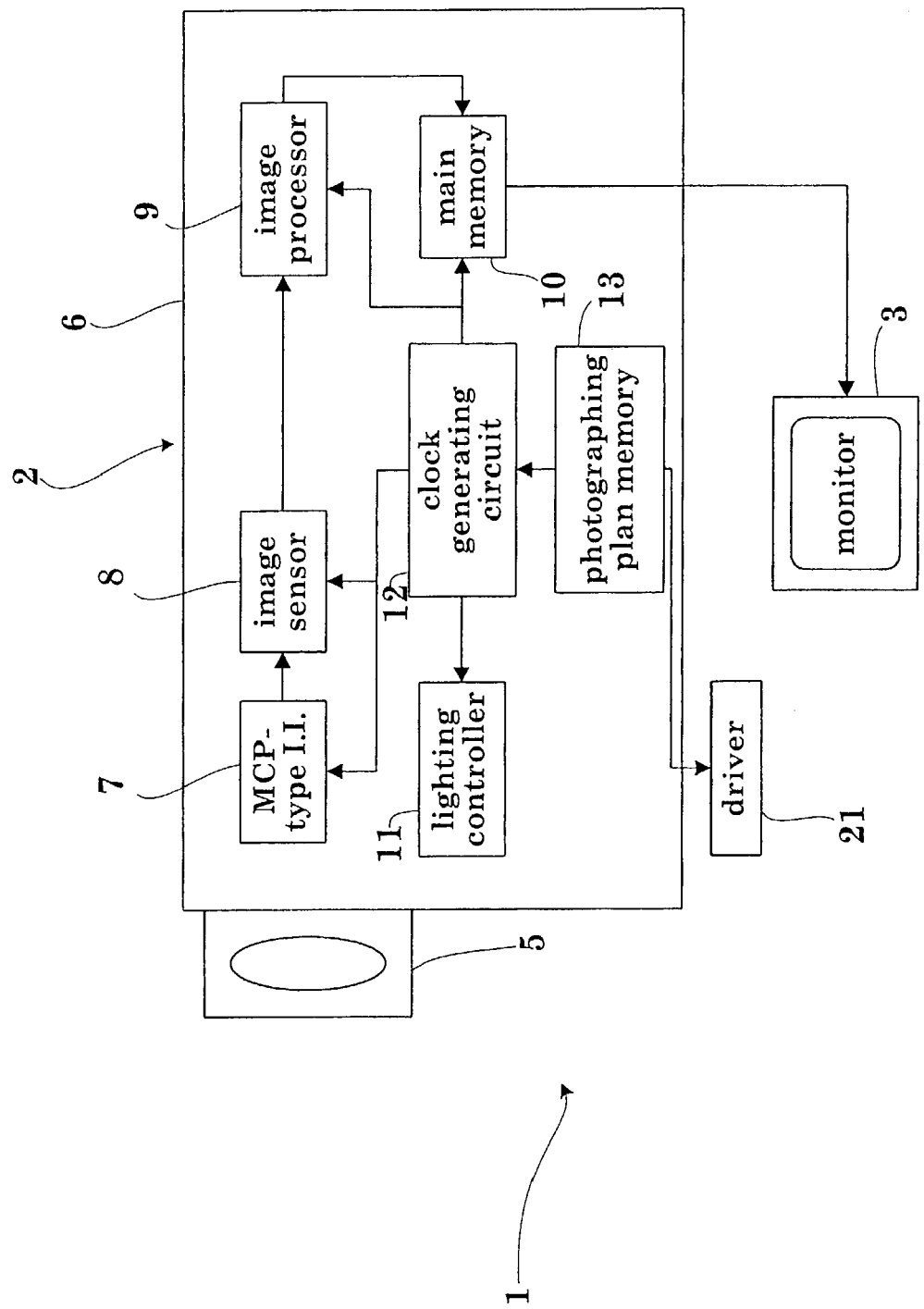
FIG. 7 is a block diagram showing an entire photographic apparatus in a third embodiment.

The third embodiment of this invention will be described next. Like reference numerals are used to identify like parts which are the same as in the first and second embodiments and will not be described again. A photographic apparatus in the third embodiment has a construction as shown in FIG. 7. This photographic apparatus has the same construction as in the second embodiment shown in FIG. 6, except that the third embodiment includes no trigger generating circuit and that, in the third embodiment, the photographing plan memory directly controls the driver. The third embodiment will be described, exemplifying photography of an iron ball serving as a photographic subject being broken in a direct way.

The driver 21 in the third embodiment is in the form of a hammer or the like for breaking the iron ball directly. The photographing plan memory 13 in the third embodiment stores a photographing plan as shown in FIG. 8. A timing chart and a flow chart are omitted.

The "photographing mode" and "photographing speed" in FIG. 8 are the same as in the first embodiment shown in FIG. 3. In the column "frame No." in FIG. 8, frame Nos. "0" to "29" are obtained by the low-speed photography with the photographing speed at 10,000 frames per second, frame Nos. "30" to "69" are obtained by the high-speed photography with the photographing speed at 100,000 frames per second, and frame Nos. "70" to "99" are obtained by the low-speed photography with the photographing speed at 20,000 frames per second. In the third embodiment, the photographing plan is prepared in advance to set photographing conditions for changing from low-speed photography to high-speed photography in time of destruction of the iron ball. Thus, a change is made without generating a trigger. For the above reason, a change is made from low-speed photography to high-speed photography, while directly breaking the iron ball, at the 30th frame from the start of photography.

The photographing apparatus 1 in the third embodiment stores a predetermined photographing plan prepared in advance, sets photographing conditions based on the predetermined photographing plan, and varies the photographing conditions during a series of photographing operations. Consequently, a way in which the iron ball is directly broken may be photographed with ease.

In the third embodiment, as distinct from the first and second embodiments, a change is made from low-speed photography to high-speed photography not based on a trigger but based only on the photographing plan prepared in advance. A lag could occur between an expected time of occurrence of a phenomenon and a time when the phenomenon actually occurs. The third embodiment, in which the iron ball is destroyed directly, has little chance of such a time lag.

Fourth Embodiment

Figure 9:
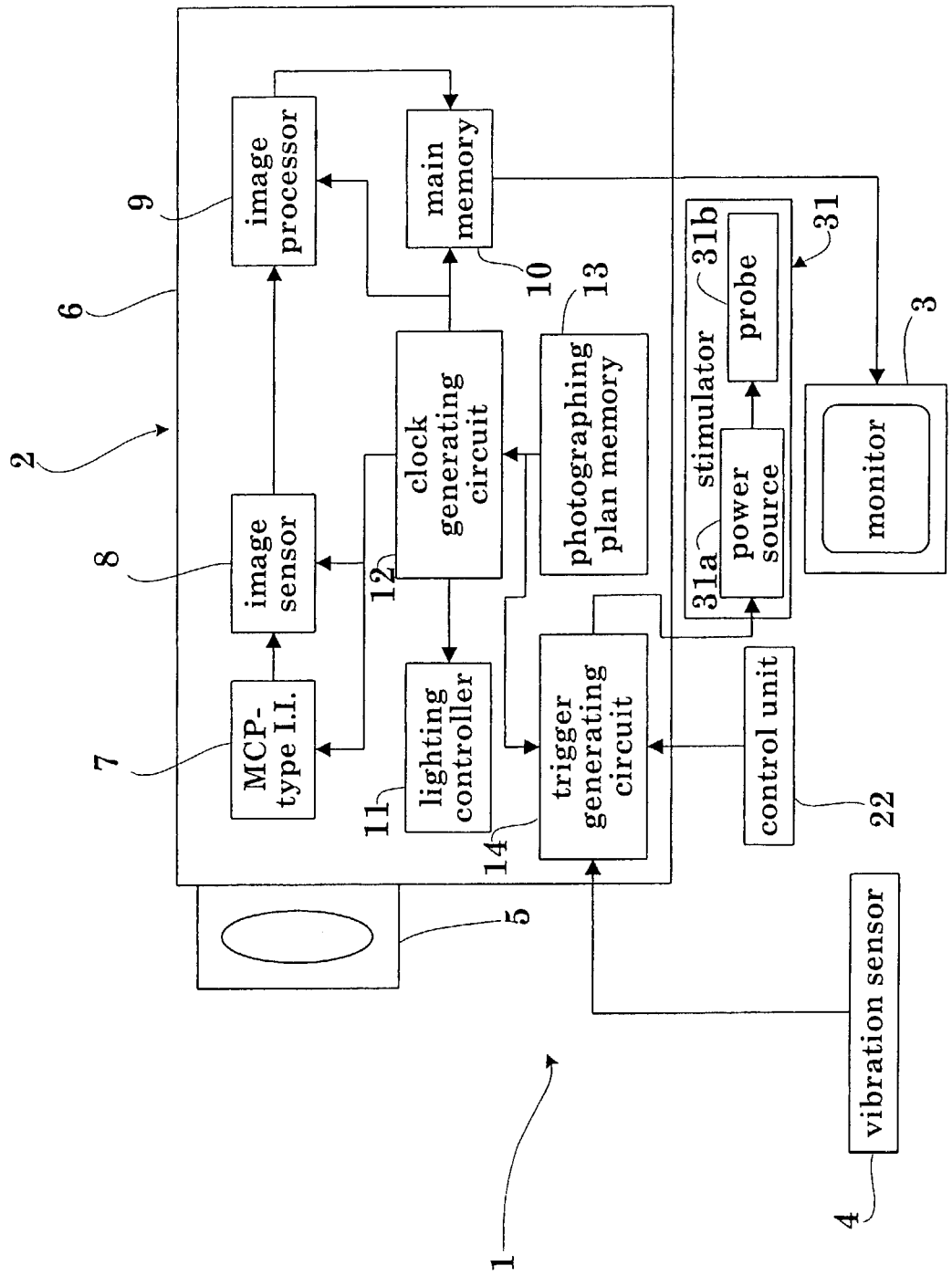
FIG. 9 is a block diagram showing an entire photographic apparatus in a fourth embodiment.

The fourth embodiment of this invention will be described next. Like reference numerals are used to identify like parts which are the same as in the first to third embodiments and will not be described again. A photographic apparatus in the fourth embodiment has a construction as shown in FIG. 9. This photographic apparatus is a combination of the apparatus in the first embodiment shown in FIG. 2 and the apparatus in the second embodiment shown in FIG. 6, with the driver 21 in the second embodiment replaced by a stimulator 31. The fourth embodiment will be described, exemplifying photography of movement of microbes serving as a photographic subject after a stimulus is given to the microbes. In the fourth embodiment, the vibration sensor 4 detects vibration caused by the movement of the microbes.

The stimulator 31 includes a power source 31a and a probe 31b. The power source 31a transmits an electric signal to the probe 31b synchronously with the clock signal outputted from the clock generating circuit 12. The probe 31b has a tip end thereof in contact with the microbes. The electric signal gives an electric stimulus to the microbes through the probe 31b. The microbes do not start movement immediately after the stimulation, but a time lag corresponding to "y frames" occurs. The stimulator 31 corresponds to the motion applying device of this invention.

A command for stimulus application may be inputted to the operating unit 22 to give a stimulus to the microbes from the stimulator 31.

Figure 11:
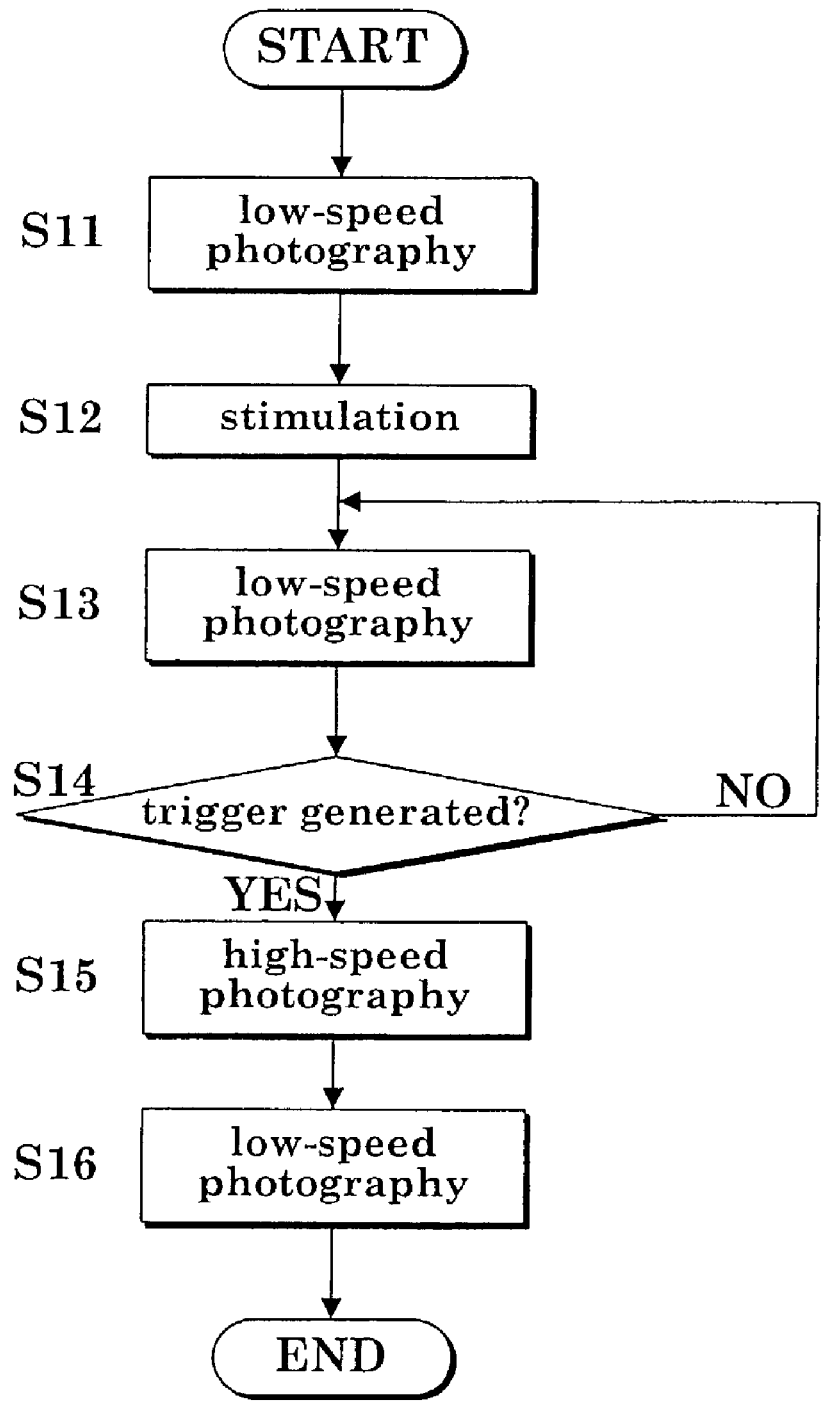
FIG. 11 is a flow chart showing a photographic method in the fourth embodiment.

The photographing plan memory 13 in the fourth embodiment stores a photographing plan as shown in FIG. 10 and a procedure as shown in the flow chart of FIG. 11. Photography is performed according to this flow chart. A timing chart is omitted.

In the column "frame No." in FIG. 10, frame Nos. "0" to "39" and "40" to "40+(y−1)" are obtained by the low-speed photography with the photographing speed at 10,000 frames per second, frame Nos. "y+40" to "y+69" are obtained by the high-speed photography with the photographing speed at 100,000 frames per second, and frame Nos. "y+70" to "y+99" are obtained by the low-speed photography with the photographing speed at 20,000 frames per second. A stimulus is given to the microbes at the 40th frame from the start of photography. As noted above, a movement starts y frames from the stimulation. The frame number when a trigger is generated, or when the microbes start movement, is "y+40". Thus, the microbes start movement at "(y+40) frame" from the start of photography, whereupon a trigger is generated and at the same time a change is made from low-speed photography to high-speed photography.

Next, a photographic method in the fourth embodiment will be described with reference to the flow chart of FIG. 11.

(Step S11) Low-Speed Photography

Since variations are slack before the microbe starts movement at step S15, photographs are taken at relatively long intervals, i.e. at low speed. The photographing speed is 10,000 frames per second (with photographing intervals at 100 microseconds per frame).

(Step S12) Stimulation

To stimulate the microbes, an electric signal is transmitted to the probe 31b at the 40th frame from the start of photography.

(Step S13) Low-Speed Photography

After the stimulation and until the microbes start movement, i.e. until a trigger is generated, the photography is continued with the photographing speed at 10,000 frames per second (with photographing intervals at 100 microseconds per frame).

(Step S14) Trigger Generated?

Whether a trigger is generated by the trigger generating circuit 14 is determined. In the absence of a trigger, the low-speed photography in step S13 is continued. When a trigger is generated, the vibration sensor 4 detects a start of movement of the microbes as vibration. The timing of detection is taken in as a trigger, and a change is made from the low-speed photography to the high-speed photography in step S15.

(Step S15) High-Speed Photography

At a moment the microbes start movement, rapid variations take place. Thus, photographs are taken at short intervals, i.e. at high speed. The photographing speed is 100,000 frames per second (with the photographing interval at 10 microseconds per frame) for 30 frames (for frame Nos. "x+40" to "x+69"). After taking photographs for 30 frames, a change is made from the high-speed photography to the low-speed photography in step S16.

(Step S16) Low-Speed Photography

After lapse of a predetermined time from the start of movement of the microbes, variations may be slack. Thus, photographs are taken at relatively long intervals, i.e. at low speed. The photographing speed is 20,000 frames per second (with the photographing interval at 50 microseconds per frame).

As in the photographic method with the series of steps S11-S16 and the photographic apparatus 1 in the fourth embodiment, photographs may be taken by a combination of the first and second embodiments. Where no time lag occurs between the stimulation of the microbes and the start of movement of the microbes, a change may be made from low-speed photography to high-speed photographing upon stimulation of the microbes.

The invention according to the first to fourth embodiments is not limited to what is described above, but may be modified as follows:

(1) In the first to fourth embodiments described above, the exposure time is fixed regardless of the photographing modes, i.e. regardless of variations in the photographing intervals, to take photographs with a fixed quantity of incident light per unit frame from the light emitter of the lighting controller 11. Where little lag occurs with the exposure time as a result of variations in the photographing intervals, or photography is performed appropriately even with a lag of some extent, photographs may be taken at varied photographing intervals, without fixing the exposure time, for example, with an exposure time set according to a ratio of photographing intervals.

The illumination time or illumination intensity besides the exposure time may be fixed. As distinct from the exposure time, the illumination time includes a time of continuous illumination as well as times of intermittent illumination between the photographing intervals.

(2) In the first and fourth embodiments described above, the vibration sensor 4 is used for detecting a motion of a photographic subject. The motion of the photographic subject is not limited to the explosion of a balloon as in the first embodiment or movement of microbes as in the fourth embodiment, and the device for detecting the motion is not limited to the vibration sensor. Motions of the photographic subject may, for example, be those of fast moving bodies such as rockets, explosion, turbulence, electric discharge, movement of microbes under a microscope, and signal transfer of the brain and nervous system. When photographing a launch of a fast moving body such as a rocket, the launch may be detected based on reception of a variation in acoustic wave or frequency caused by launching sound. When photographing an electric discharge phenomenon, the time of discharge may be detected based on a variation of an image (pixel value) appearing on a monitor. In the second embodiment, an iron ball is made to collide with a wall. In this case, the iron ball moving across a sensor may be detected.

The motion applying device of this invention for applying a predetermined motion to the photographic subject is variable with the motion of the photographic subject. The device may be, but not limited to, a motor or a hammer as in the second and third embodiments, or a probe for applying a stimulus as in the fourth embodiment.

(3) In the first to fourth embodiments described above, photographing conditions are set based on a predetermined photographing plan prepared in advance, and are varied during a series of photographing operations. The photographing conditions may be switched manually at an appropriate time. Where, for example, a command for applying a predetermined motion is inputted to an operating unit to apply the motion to the photographic subject through the motion applying device of this invention, the time for applying the motion is known, and therefore the photographing conditions may be varied simultaneously with the input to the operating unit or application of the motion to the photographic subject, without preparing a photographing plan in advance. This is not applicable where, for example, the time of occurrence of a phenomenon is unknown, such as an explosion. However, it is effective where, as in the second and third embodiments, the operating unit or the photographing plan memory 13 directly applies a motion to the photographic subject.

The photographing conditions may be switched manually at an appropriate time without synchronization with the signal from the clock device (clock generating circuit 12 in the first to fourth embodiments), for facility of photo-taking control. However, where, for example, the time of occurrence of a phenomenon is unknown, such as an explosion, it is preferable to vary the photographing conditions based on a photographing plan or a trigger, or take photographs synchronously with the signal from the clock device.

(4) In the first to fourth embodiments described above, the photographing modes, i.e. photographing intervals, are varied during a series of photographing operations. The photographing conditions are not limited to the photographing intervals. For example, the exposure time, illumination time or illumination intensity may be varied.

(5) In the first to fourth embodiments described above, the photographing apparatus is controlled en bloc along with the single image sensor to vary the photographing conditions during a series of photographing operations. An image sensor may be provided for each apparatus, and each image sensor may be controlled. This aspect will be explained by taking the photographing plan memory 13 in the first to fourth embodiments for example. The photographing plan memory 13 is removed from the main body 2. A single photographing plan memory 13 is connected to a plurality of main bodies 2 to control the processing units (particularly the image sensors 8) through the clock generating circuits 12 in the respective main bodies 2. In this case, the photographing plan memory 13 controls a plurality of image sensors 8, and thus can control, en bloc, a plurality of photographing apparatus along with the image sensors 8.

The following fifth embodiment solves the problem (II).

Fifth Embodiment

Figure 12:
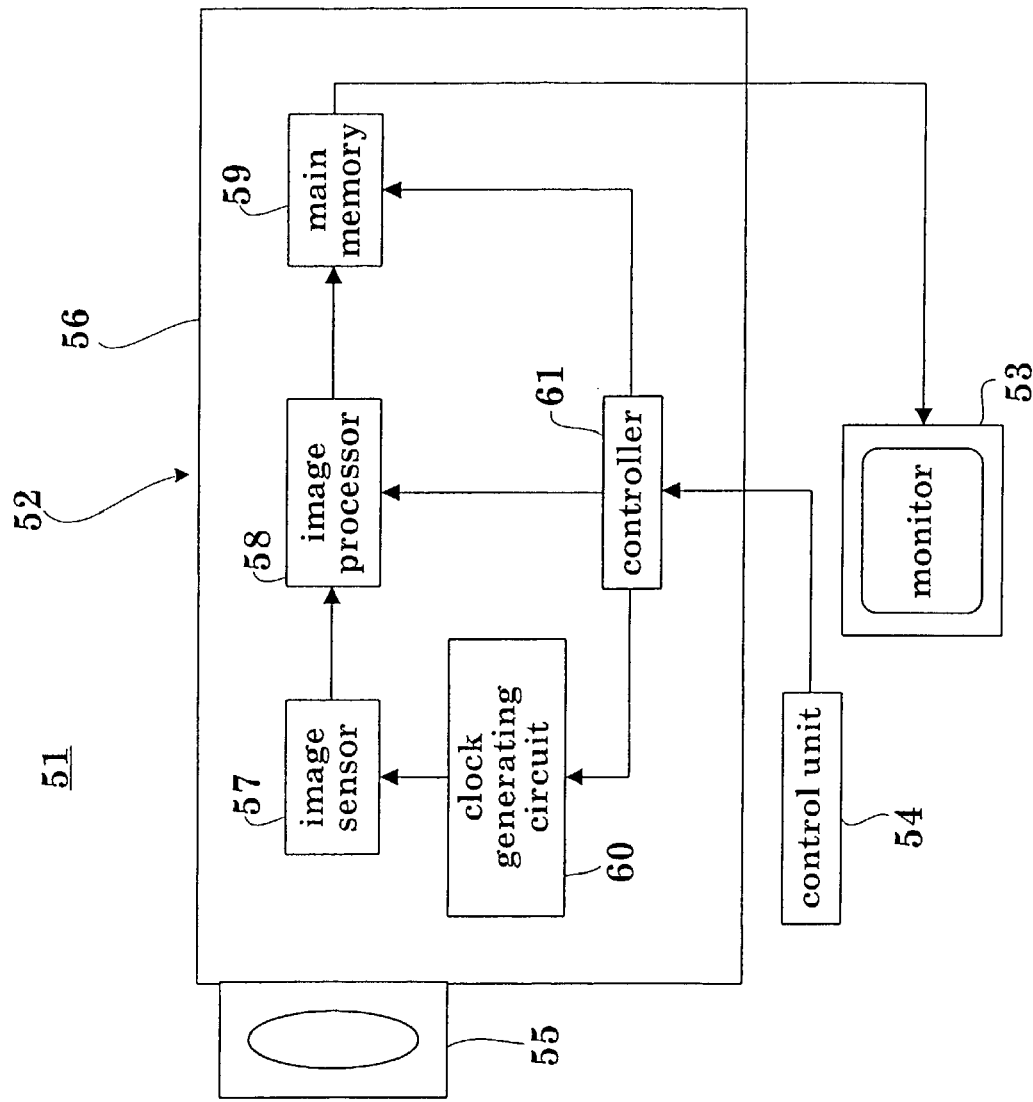
FIG. 12 is a block diagram showing an outline of a photographic apparatus in a fifth embodiment.
Figure 13:
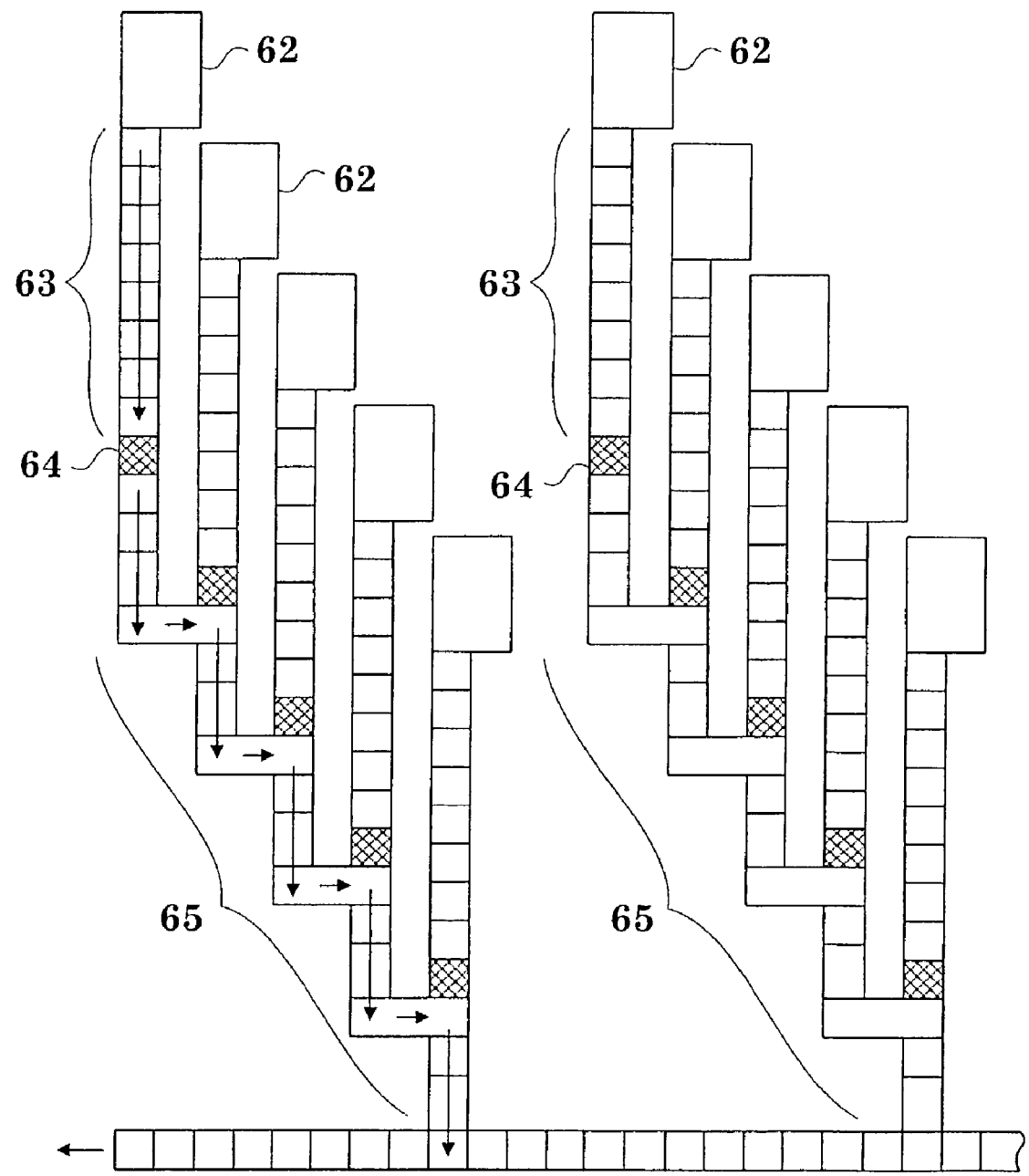
FIG. 13 is a view showing an outline of an image sensor.
Figure 14:
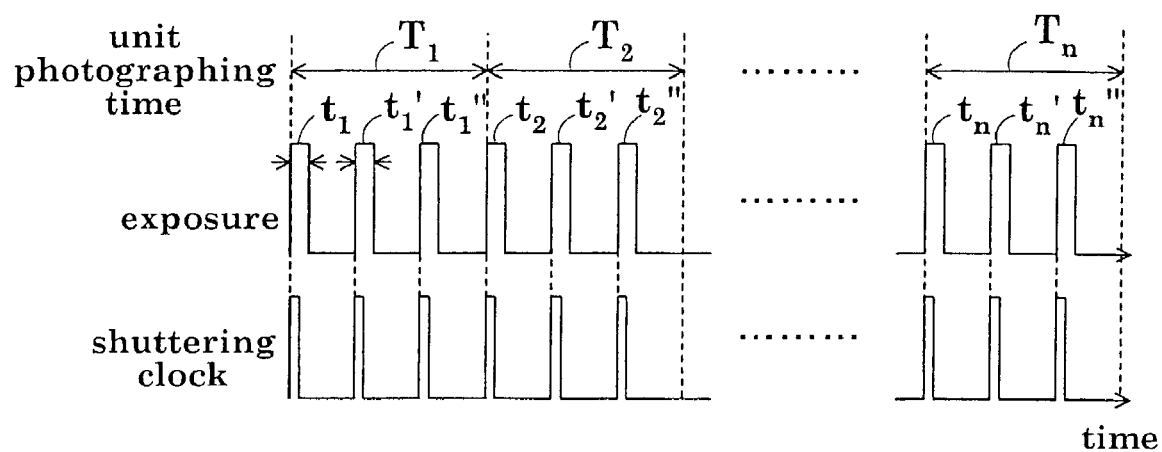
FIG. 14 is a pulse waveform chart showing photographic conditions such as a unit photographing time and exposure time.

FIG. 12 is a block diagram showing an entire photographic apparatus in the fifth embodiment. FIG. 13 is a view showing an outline of an image sensor. FIG. 14 is a pulse waveform chart (timing chart) showing timing of photographing intervals and exposure time.

Numeral 51 in FIG. 12 denotes the photographic apparatus in the fifth embodiment. The photographic apparatus 51 includes a main body 52, a monitor 53 and an operating unit 54.

The main body 52 includes an optical lens 55 for taking in light from a photographic subject, and a processing block 56 for converting optical images taken in through the optical lens 55 to electric signals (charge signals) and performing various processes.

The processing block 56 includes an image sensor 57, an image processor 58, a main memory 59, a clock generating circuit 60 and a controller 61.

As shown in FIG. 13, the image sensor 57 has a plurality of photodiodes for photoelectric conversion, and CCD elements 63 in the form of one-dimensional array for storing charge signals resulting from the photoelectric conversion. The charge signals generated and stored through the photoelectric conversion of optical images taken in are outputted from drains 64 while waiting the trigger and are read out through the vertical read out CCD 65 after the trigger input. The image sensor 57 acts as an electronic shutter when successively storing and outputting charges generated by photoelectric conversion. The photodiodes 62 correspond to the photo detector, and the CCD elements 63 to the charge storage elements of this invention.

The CCD elements 63, instead of being in the one-dimensional arrays, may be arranged in a two-dimensional array.

The image processor 58 has an amplifier and an analog-to-digital converter (not shown) for amplifying the signals and converting these analog signals to digital signals. That is, the image processor 58 has a function to process the electric signals outputted from the image sensor 57 as photographic images. This will be described by taking, for example, a case of photographing a phenomenon occurring when particles contained in a fluid circulate through a channel, processing the images at the image processor 58 to obtain information on particle variations, and displaying the information on video or dynamic images.

In this case, an input is made from the operating unit 54 to the controller 61 to set, as shown in the timing chart of FIG. 14, unit photographing times $T_1$–$T_n$ (n being a positive integer, which applies also to subsequent instances) to be 1 millisecond, and exposure to be taken for 1 microsecond three times ($t_n$, $t_n'$ and $t_n''$) within each unit photographing time.

Figure 15:
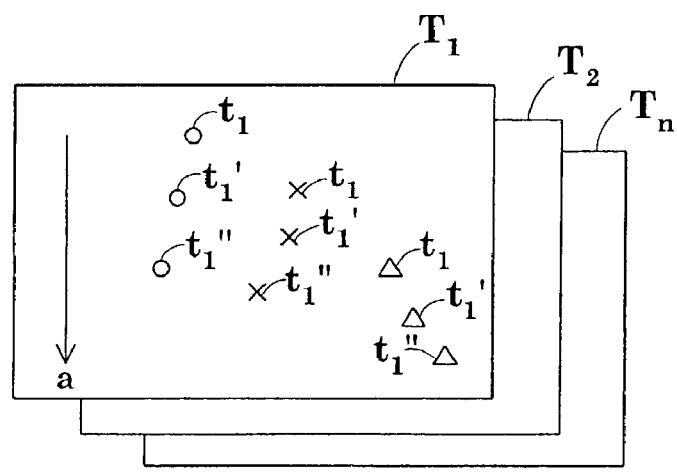
FIG. 15 is a view showing processed image information for one frame.

A series of photographing operations provides image information for three photographs every unit photographing time. Of the image information for three photographs, the information for the first photograph is regarded as reference image information, and the remaining image information for each of the two photographs is, for example, binarized to obtain edge coordinates of the particles. The edge coordinates are combined with the image information of the first photograph to obtain image information for one photograph and corresponding to one frame for output as a dynamic image. Thus, as shown in FIG. 15, the image of one frame outputted presents particles included in the three photographs (shown in ○, Δ and X) moving, with time, in a flowing direction (arrow "a" in FIG. 15) of the fluid. By displaying, in dynamic images, the image information acquired from the series of photographing operations on the monitor 53, variations in the direction of movement of the particles may be observed on the output screen with increased accuracy.

Next, the image information provided by the image processor 58 is stored in the main memory 59, and successively displayed on the monitor 53.

The clock generating circuit 60, based on the photographing conditions inputted to the controller 61 described hereinafter, generates a shuttering clock for carrying out exposure for each frame in the unit photographing times during the series of photographing operations. As shown in FIG. 14, for example, the clock is generated three times to cause three exposures ($t_n$, $t_n'$ and $t_n''$) within each unit photographing time $T_n$.

The controller 61 has a function to control, en bloc, the image sensor 57, image processor 58, main memory 59 and clock generating circuit 60. The clock generating circuit 60 and controller 61 correspond to the varying device of this invention.

The controller 61 has, inputted thereto from the operating unit 54 in advance, photographing conditions such as frame intervals according to a photographic subject, unit photographing time, the number of exposures in the unit photographing time, and exposure time, for each unit photographing time. Based on the conditions inputted, the controller 61 drives the image sensor 57 through the clock generating circuit 60. The photographing conditions will be described in detail hereinafter, using examples of the photographic method. The photographic apparatus having the above construction is used in the examples.

EXAMPLE 1

This example will be described with reference to FIG. 16, in which, during a series of photographing operations, a plurality of exposures are performed in each unit photographing time, and frame intervals are varied. It is assumed in this example, for expediency of description, that the number of exposures performed in each unit photographing time is three ($t_n$, $t_n'$ and $t_n''$), each of the unit photographing times $T_1$–$T_n$ is set to 1 millisecond, and each exposure time to 1 microsecond.

Figure 16:
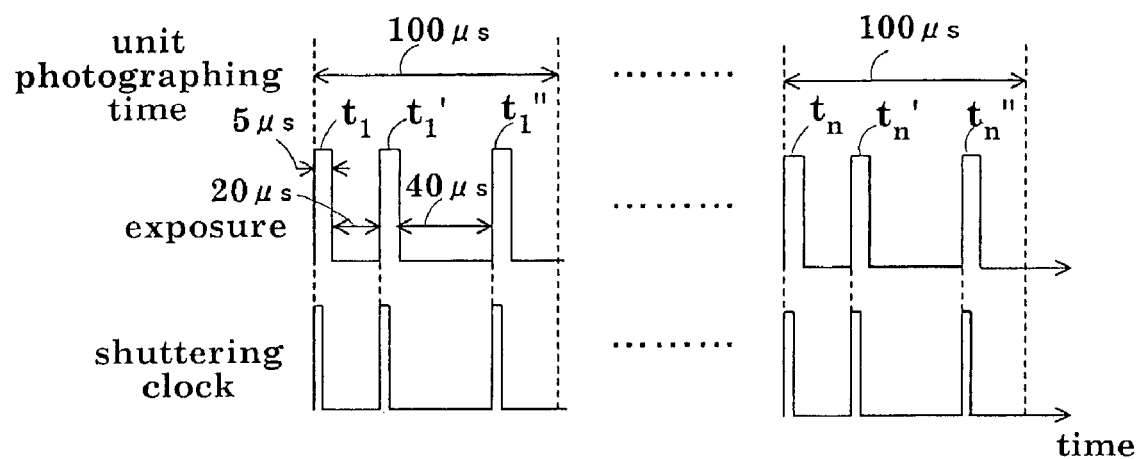
FIG. 16 is a pulse waveform chart showing photographic conditions of example 1.

As shown in FIG. 16, a series of photographing operations is performed with varied frame intervals in each unit photographing time such that, for example, the interval between the first exposure $t_1$ and second exposure $t_1'$ is set to 20 microseconds, and the interval between the second exposure $t_1'$ and third exposure $t_1''$ set to 40 microseconds. A frame interval in this example means a period from the end of one exposure to the start of a next exposure. The variation in the frame intervals is not limited to this form, but may, for example, be made by adjusting the exposure time.

Figure 17:
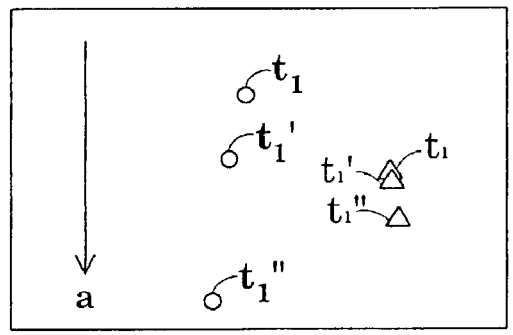
FIG. 17 is a view showing image information for one frame obtained from example 1.

With such photographing method, an accurate confirmation may be made on images as to which shows a large amount of change and which shows a small amount of change in the photographic subject. That is, when the image information for three photographs obtained within the unit time is combined and processed by the image processor 58, as shown in FIG. 17, a particle marked ○ having a large amount of change (movement), as is clear from a comparison between a point of time $t_1$ and a point of time $t_1'$ separated by the short frame interval, is in different positions, indicating that the particle has moved by a large extent in the direction of arrow "a". On the other hand, a particle marked Δ having a small amount of movement appears as superimposed in substantially the same position as at points of time $t_1$ and $t_1'$.

However, a comparison between the point of time $t_1'$ and point of time $t_1''$ separated by the long frame interval clearly shows that the particle marked Δ having a small amount of movement has in fact moved.

Thus, variations of objects having different amounts of change may be distinguished on an image by a small number of exposures taken in the unit photographing time. Furthermore, by displaying this in a dynamic image on the monitor 53, variations of the photographic subject, e.g. variations in the direction of movement, may be checked on the screen with increased accuracy.

EXAMPLE 2

In this example, each of the unit photographing time and exposure time is varied at a fixed rate during a series of photographing operations.

Figure 18:
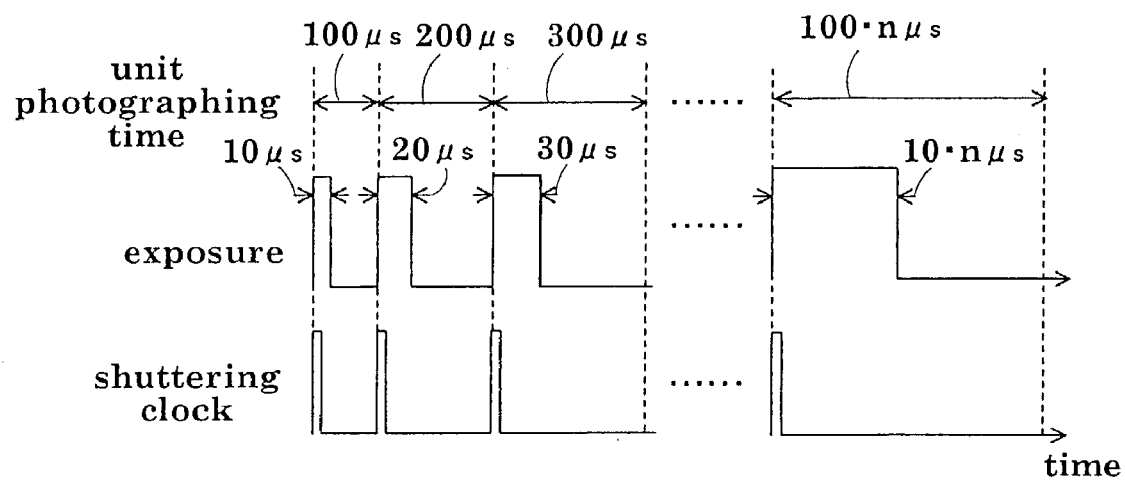
FIG. 18 is a pulse waveform chart showing photographic conditions of example 2.

As shown in FIG. 18, the unit photographing time is set to vary with time as 100 (microseconds), 200 (microseconds), ..., and 100·n (microseconds), and the exposure time as 10 (microseconds), 20 (microseconds), ... and 10·n (microseconds).

This photographing method is suitable for accurately photographing a phenomenon having a variation speed reducing regularly with time such as when an iron ball collides with and cuts into a wall. In this case, exposure time may be fixed.

EXAMPLE 3

In this example, one exposure is performed within a fixed unit time during a series of photographing operations, and exposure time is varied for every unit photographing time.

Figure 19:
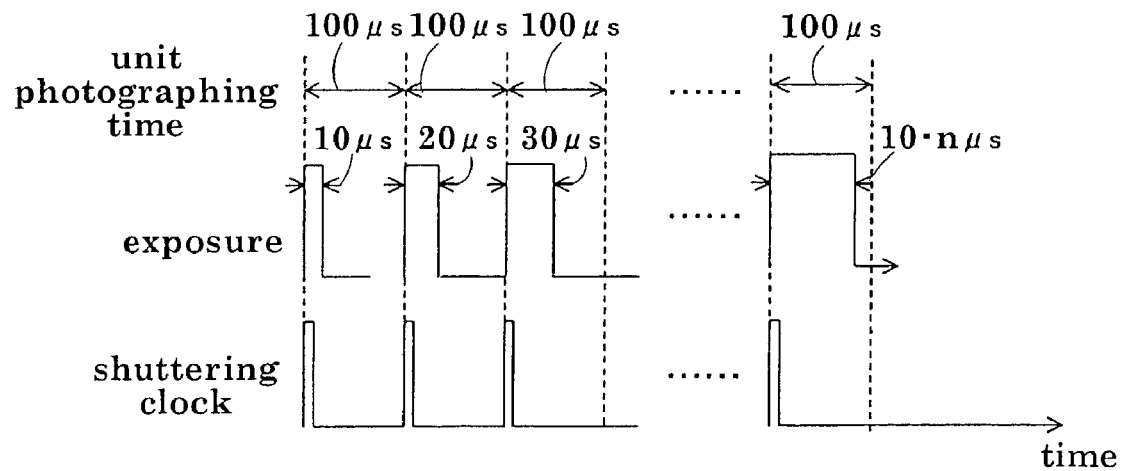
FIG. 19 is a pulse waveform chart showing photographic conditions of example 3.

As shown in FIG. 19, during a series of photographing operations for n frames, unit photographing time is fixed to 100 microseconds from beginning to end, and exposure time for each unit photographing time is varied as 10 (microseconds), 20 (microseconds), ..., 10·n (microseconds).

By varying only the exposure time for every unit photographing time, a confirmation may be made of an optimal photographing condition according to a photographic subject, i.e. an exposure time for allowing an optimal quantity of light to enter the image sensor 57 to avoid halation occurring with output images.

This example is suited for photographing an explosion accompanied by self-flashing. That is, while a phenomenon occurs with an emission of light, plural types of image information are acquired with varied exposure times. Selection may be made of an exposure time resulting in clear image information from among the plural types of image information.

Thus, duplication experiment may be conducted only once for setting an exposure time which is one of the photographing conditions.

EXAMPLE 4

In this example, one exposure is performed in a fixed unit photographing time during a series of photographing operations, with the unit photographing time and exposure time varied synchronously with a signal (trigger) applied from outside. For example, the exposure time is varied when an arrow thrusts into a balloon to explode the latter.

Figure 20:
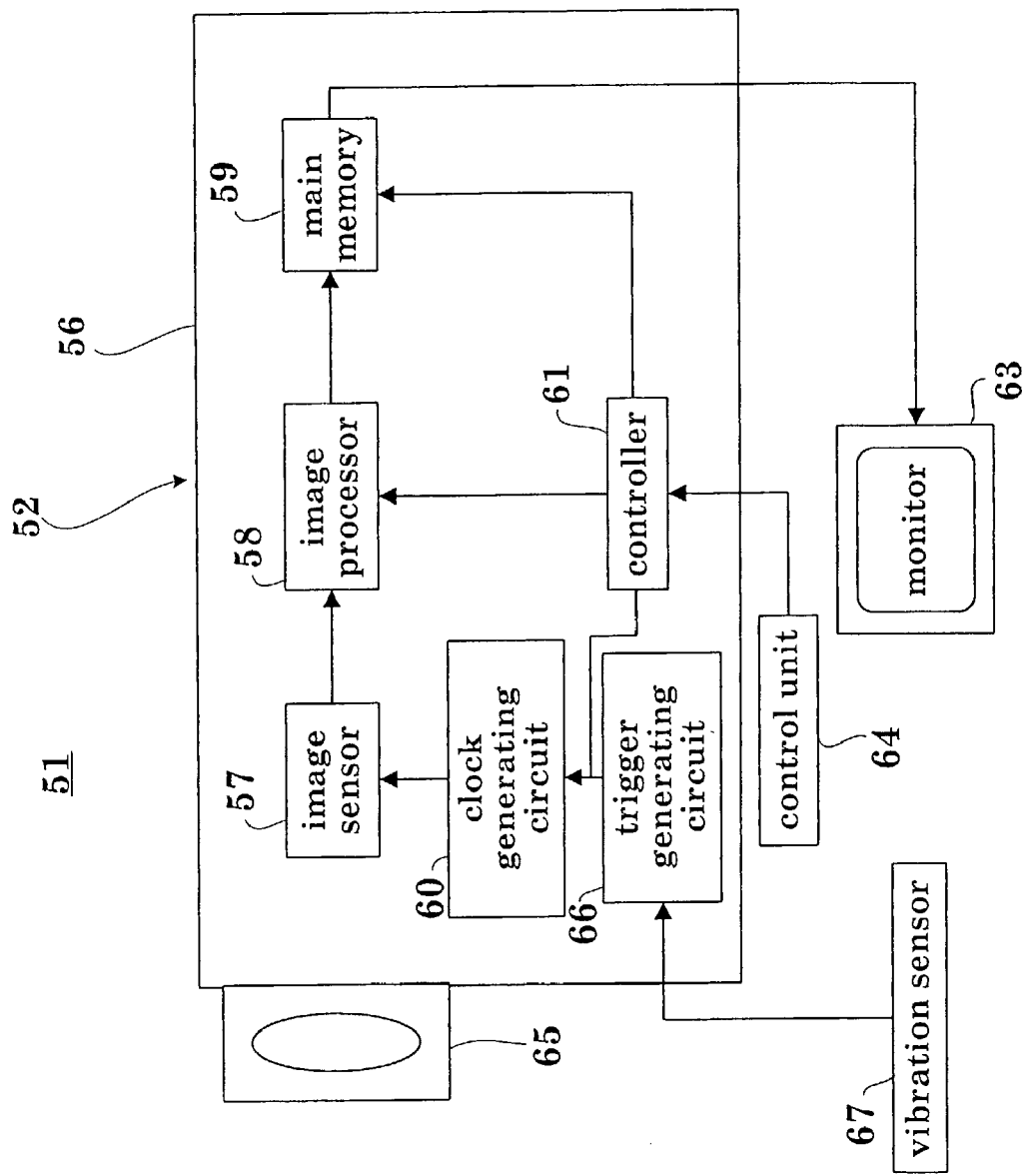
FIG. 20 is a block diagram showing an apparatus used in example 4.

To implement this example, as shown in FIG. 20, a trigger generating circuit 66 is added to the construction shown in FIG. 12, with an external vibration sensor 67 connected to the photographing apparatus 51.

The vibration sensor 67 detects vibration produced by the explosion of the balloon. The trigger generating circuit 66 takes in timing of the detection by the vibration sensor 67 as a trigger. The trigger generated by the trigger generating circuit 66 is applied to the clock generating circuit 60.

Figure 21:
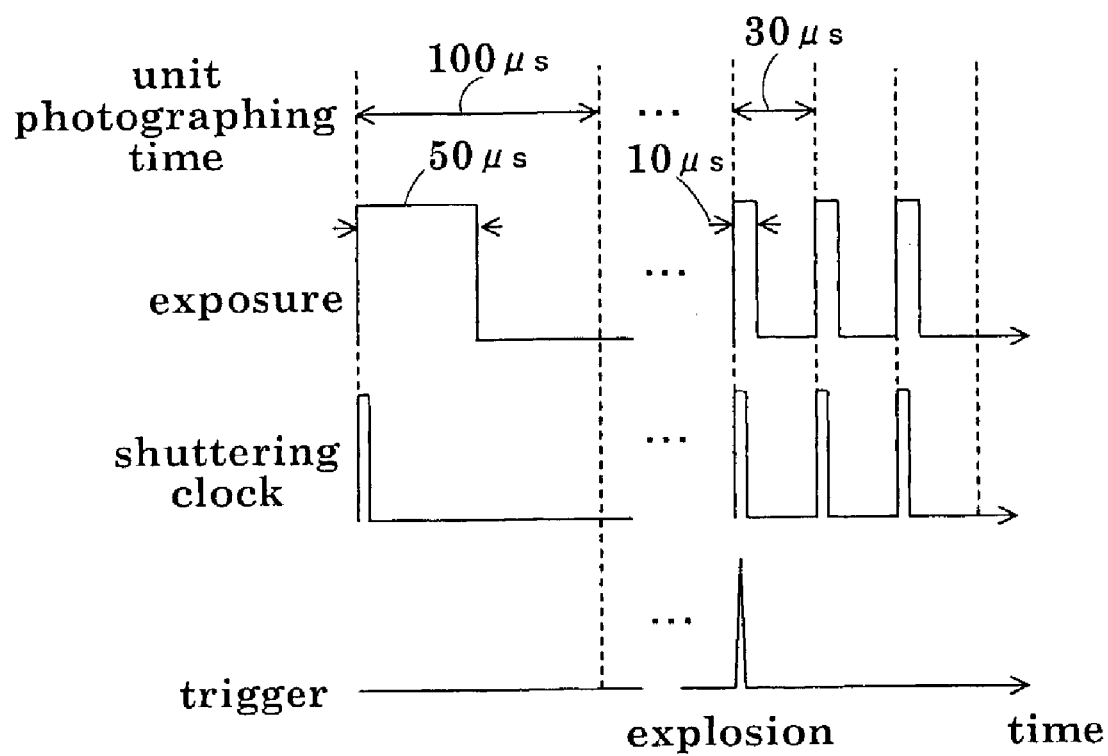
FIG. 21 is a pulse waveform chart showing photographic conditions of example 4.

Thus, in time of photography using this apparatus, as shown in FIG. 21, photographs are taken with a unit photographing time set to 100 microsecond and an exposure time to 50 microseconds before an arrow is shot to thrust into the balloon. When the vibration sensor 67 detects vibration produced by the explosion of the balloon, a trigger is applied to the clock generating circuit 60. Then, photographs are taken continually with the unit photographing time changed to 30 microseconds and exposure time to 10 microseconds.

By taking in the signal (trigger) from outside as noted above, a phenomenon difficult to photograph in a timely way may be photographed easily and accurately.

As described above, inputs are made to the controller 61 beforehand to vary photographing conditions such as frame interval, unit photographing time, the number of exposures in each unit photographing time, and exposure time, for every unit photographing time according to a photographic subject. The image sensor 57 is driven through the clock generating circuit 60, whereby clear dynamic images may be obtained without being influenced by variations of the photographic subject.

The invention according to the fifth embodiment including Examples 1 to 4 is not limited to the embodiment described, but may be modified as follows:

(1) In the fifth embodiment, image information for a plurality of photographs acquired in the unit photographing time is binarized to obtain edge coordinates. Image information is reflected on the reference image information of the first photograph to obtain image information for one frame. The invention is not limited to this form. When reflecting information on an object difficult to identify, multivalued or continuous-tone information may be used. Instead of superimposing information for a plurality of photographs on one image, a locus of movement of an object may be indicated by determining substantial center coordinates in the edge coordinates obtained and linking these center coordinates in order of time series. A direction of movement may be indicated by using an arrow.

When displaying a locus of movement of an object, a distance of movement of the object may be determined by using image information for two consecutive photographs in order, of the image information for a plurality of photographs acquired in the unit photographing time. A moving speed of the object may be derived in the order of photography from the distance of movement obtained and a frame interval (time) between the image information used in determining the distance. Furthermore, an acceleration of the object may be determined by using such moving speeds in the order of photography.

(2) In the fifth embodiment, the photographic subject is not irradiated with light. Photographs may be taken by using an ordinary illumination device such as an electric light.

This invention may be embodied in other specific forms without departing from the spirit or essential attributes thereof and, accordingly, reference should be made to the appended claims, rather than to the foregoing specification, as indicating the scope of the invention.

What is claimed is:

1. A photographic apparatus having image pickup means for taking in optical images of a photographic subject, performing a photoelectric conversion of the optical images taken in, and outputting the images as electric signals, the electric signals outputted from the image pickup means being processed as photographic images, said apparatus comprising:

photographing condition varying means for varying, during a series of photographing operations, photographing conditions which are a physical quantity of the apparatus needed for performing the photography, and
   limited storage means for storing the electric signals during the series of photographing operations,
   wherein said photographing condition varying means is photography planning means for setting said photographing conditions based on a predetermined photographing plan, said photography planning means being arranged to vary the photographing conditions during the series of photographing operations based on said photographing plan under conditions imposed by said limited storage means.

2. A photographic apparatus as defined in claim 1, further comprising trigger input means for detecting a motion of said photographic subject and taking in a time of detection as a trigger, said photography planning means being arranged to vary the photographing conditions during the series of photographing operations based on the trigger from said trigger input means.

3. A photographic apparatus as defined in claim 1, further comprising:

motion applying means for applying a predetermined motion to said photographic subject; and
   trigger output means for outputting a trigger in timed relationship with said predetermined motion applied from said motion applying means to said photographic subject;
   said photography planning means being arranged to vary the photographing conditions during the series of photographing operations based on the trigger from said trigger output means.

4. A photographic apparatus as defined in claim 1, further comprising clock means for controlling operation of said image pickup means, said photographing conditions including photographing intervals between photo-taking acts, said photography planning means being arranged to vary said photographing intervals synchronously with a signal from said clock means.

5. A photographic apparatus as defined in claim 1, further comprising clock means for controlling operation of said image pickup means, said photographing conditions including an exposure time with incident light between photographing intervals between photo-taking acts, said photography planning means being arranged to vary said exposure time synchronously with a signal from said clock means.

6. A photographic apparatus as defined in claim 1, further comprising:

clock means for controlling operation of said image pickup means; and
   illuminating means for illuminating said photographic subject;
   said photographing conditions including one of an illumination time for continuously or intermittently emitting light from said illuminating means to said photographic subject and an illumination intensity of the light emitted from said illuminating means to said photographic subject;

said photography planning means being arranged to vary one of said illumination time and illumination intensity synchronously with a signal from said clock means.

7. A photographic apparatus as defined in claim 1, wherein said photographing conditions include photographing intervals between photo-taking acts, and an exposure time with incident light between said photographing intervals, said photography planning means being arranged to maintain said exposure time constant regardless of variations in said photographing intervals.

8. A photographic apparatus as defined in claim 1, further comprising illuminating means for illuminating said photographic subject, said photographing conditions including photographing intervals between photo-taking acts and one of an illumination time for continuously or intermittently emitting light from said illuminating means to said photographic subject and an illumination intensity of the light emitted from said illuminating means to said photographic subject, said photography planning means being arranged to maintain said exposure time constant regardless of variations in said photographing intervals.

9. A photographic apparatus as defined in claim 1, wherein said image pickup means is provided for each apparatus, said photography planning means being arranged to control each said image pickup means to vary the photographing conditions during the series of photographing operations.

10. A photographic apparatus as defined in claim 1, wherein said image pickup means is an image sensor with a photo detector for performing a photoelectric conversion of incident light, and a plurality of charge storage elements for storing charge signals received from the photo detector, as classified into a plurality of frames of different photographing times, the image sensor outputting the charge signals stored in the charge storage elements, said apparatus comprising:

(a) varying means for varying at least one of a frame interval, a photographing time and an exposure condition a plurality of times for each unit photographing time during a series of photographing operations.

11. A photographing apparatus as defined in claim 10, further comprising:

(b) image processing means for performing a plurality of exposures in each unit photographing time during the series of photographing operations, wherein said exposure condition is the number of exposures performed in each unit photographing time, and combining, into one image, image information for a plurality of photographs acquired in each unit photographing time; and (c) display means for displaying the image information processed.

12. A photographing method using the photographing apparatus defined in claim 10, comprising a step of performing a plurality of exposures in each unit photographing time and varying said frame interval during the series of photographing operations.

13. A photographing method as defined in claim 12, comprising a step of varying at least one of the unit photographing time and an exposure time, which is said exposure condition, at a fixed rate during the series of photographing operations.

14. A photographing method as defined in claim 12, comprising a step of performing one exposure in a fixed unit photographing time and varying an exposure time for each exposure during the series of photographing operations.

15. A photographing method as defined in claim 12, wherein said frame interval is varied synchronously with a signal received from outside.

16. A photographing method as defined in claim 13, wherein said exposure time is varied synchronously with a signal received from outside.

17. A photographing method as defined in claim 14, wherein said exposure time is varied synchronously with a signal received from outside.

* * * * *